US006985712B2

United States Patent
Yamakawa et al.

(10) Patent No.: US 6,985,712 B2
(45) Date of Patent: Jan. 10, 2006

(54) RF DEVICE AND COMMUNICATION APPARATUS USING THE SAME

(75) Inventors: Takehiko Yamakawa, Toyonaka (JP); Toru Yamada, Katano (JP); Toshio Ishizaki, Kobe (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 505 days.

(21) Appl. No.: 10/228,646

(22) Filed: Aug. 26, 2002

(65) Prior Publication Data

US 2003/0068998 A1 Apr. 10, 2003

(30) Foreign Application Priority Data

Aug. 27, 2001 (JP) ............................ 2001-255685

(51) Int. Cl.
*H04B 1/28* (2006.01)

(52) U.S. Cl. ...................... 455/333; 455/339; 333/185

(58) Field of Classification Search ................ 455/339, 455/334, 333, 323; 333/246, 260, 166, 185
See application file for complete search history.

(56) References Cited

U.S. PATENT DOCUMENTS

| | | | | |
|---|---|---|---|---|
| 3,634,787 | A * | 1/1972 | Newell | 333/186 |
| 5,844,523 | A * | 12/1998 | Brennan et al. | 343/700 MS |
| 6,060,967 | A | 5/2000 | Asada | |
| 6,091,355 | A * | 7/2000 | Cadotte et al. | 342/104 |
| 6,198,367 | B1 * | 3/2001 | Matsunaga et al. | 333/246 |
| 6,366,179 | B1 * | 4/2002 | Kuroda | 333/133 |
| 6,476,695 | B1 * | 11/2002 | Nakamichi | 333/246 |
| 6,665,287 | B1 * | 12/2003 | Katsura et al. | 370/342 |
| 6,728,528 | B1 * | 4/2004 | Loke | 455/318 |
| 6,753,604 | B1 * | 6/2004 | Hase et al. | 257/728 |
| 2002/0000296 | A1 * | 1/2002 | Terada et al. | 156/295 |
| 2002/0008665 | A1 * | 1/2002 | Takenoshita | 343/700 MS |
| 2002/0025794 | A1 * | 2/2002 | Tamaki et al. | 455/313 |
| 2002/0030530 | A1 * | 3/2002 | Tsutsumi | 327/365 |

FOREIGN PATENT DOCUMENTS

| | | |
|---|---|---|
| EP | 1 058 333 A | 12/2000 |
| EP | 1 094 538 A | 4/2001 |
| JP | 04-079601 | 3/1992 |
| JP | 04-301901 | 10/1992 |
| JP | 2002-111218 | 4/2002 |

* cited by examiner

OTHER PUBLICATIONS

European Search Report for EP 02 01 9050, dated Oct. 8, 2003.

*Primary Examiner*—Nguyen T. Vo
*Assistant Examiner*—Nhan T. Le
(74) *Attorney, Agent, or Firm*—RatnerPrestia

(57) ABSTRACT

An RF device includes a first substrate having a lower relative dielectric constant, a first RF circuit for a lower frequency band provided in the first substrate, a second substrate having a higher relative dielectric constant larger than the lower relative dielectric constant, and a second RF circuit for a higher frequency band having a part of the second RF circuit sandwiched between the first substrate and the second substrate. The first RF circuit and the second RF circuit are connected to each other and the second substrate is partially overlaid on the first substrate. A semiconductor device or passive device is provided on a region in the surface of the first substrate on which the second substrate is not overlaid, and a multilayered wiring pattern made of copper or silver is formed in the first substrate to form the first RF circuit.

11 Claims, 21 Drawing Sheets

RF DEVICE AND COMMUNICATION APPARATUS USING THE SAME

BACKGROUND OF THE INVENTION

1. Field of the Invention

The present invention relates to an RF device mainly used in a high frequency radio apparatus, such as a cellular phone.

2. Related Art of the Invention

Recently, as mobile communication users have been increased and a system therefor has become global, an RF device has become a focus of attention that enables the EGSM, DCS and UMTS systems provided for respective frequencies shown in FIG. 18 to be used with one cellular phone. With reference to drawings, a first conventional RF device will be described below.

FIG. 19 is a cross-sectional view of the first conventional RF device. In FIG. 19, reference numeral 1101 denotes a low temperature cofired ceramic body with a low relative dielectric constant. Reference numeral 1102 denotes a multilayered wiring conductor for constituting part of an RF circuit. Reference numeral 1103 denotes an interlayer via hole and reference numeral 1104 denotes a discrete component, such as a discrete resistor, a discrete capacitor, a discrete inductor and a packaged semiconductor.

FIG. 20 is a circuit diagram of the first conventional RF device. The RF device is one provided for triple bands (EGSM, DCS and UMTS described above) comprising a diplexer 1201 that connects a transmitting/receiving switching circuit 1202 and a transmitting/receiving switching circuit 1203 to an antenna (ANT).

An operation of the first conventional RF device arranged as described above will be described.

The multilayered wiring conductor 1102 electrically interconnects a plurality of discrete components 1104 and, in a substrate 1101 made of a low temperature cofired ceramic, forms a capacitor formed in the substrate and an inductor formed in the substrate. Such capacitor and inductor constitute an RF circuit in conjunction with the discrete components 1104, and the RF circuit serves as an RF device such as an RF multilayered switch.

The diplexer 1201 directly connected to the antenna terminal (ANT) branches a signal received through the antenna terminal (ANT) to the transmitting/receiving switching circuits 1202 and 1203. The duplexer 1204 is connected to the transmitting/receiving switching circuit 1203. The transmitting/receiving switching circuit 1202 has a transmitting terminal Tx1 for EGSM transmitting and a receiving terminal Rx1 for EGSM receiving. The transmitting/receiving switching circuit 1203 has a transmitting terminal Tx2 for DCS transmitting and a receiving terminal Rx2 for DCS receiving. The duplexer 1204 has a transmitting terminal Tx3 for UMTS transmitting and a receiving terminal Rx3 for UMTS receiving.

The receiving terminal Rx2 is connected to the antenna via a diode 1205, which is in the off state during transmission using the transmitting terminal Tx2.

Transmission line 1206*a* and 1206*b* for electrical length correction, a transmitting filter 1207 and a receiving filter 1208, which are required for duplex transmission, are connected between the transmitting terminal Tx3 and the receiving terminal Rx3.

Now, a second conventional RF device will be described as another example of the send/receive switching circuit directly connected to the antenna.

FIG. 21 is an exploded perspective view of the second conventional RF device. The RF device has six dielectric substrates with high relative dielectric constant 1301*a* to 1301*f*. The dielectric substrate 1301*b* having a shielding electrode 1302*a* formed on the upper surface thereof, the dielectric substrate 1301*c* having an inter-stage coupling electrode 1303 formed on the upper surface thereof, the dielectric substrate 1301*d* having resonator electrodes 1304*a* and 1304*b* formed on the upper surface thereof, the dielectric substrate 1301*e* having input/output coupling capacitor electrodes 1305*a* and 1305*b* formed on the upper surface thereof, and the dielectric substrate 1301*f* having a shielding electrode 1302*b* formed on the upper surface thereof are stacked.

End face electrodes 1306*a* and 1306*b*, which are connected to the shielding electrodes 1302*a* and 1302 to form ground terminals, are provided at the left and right sides of the stacked dielectric substrates. On the rear of the stacked dielectric substrates, there is provided an end face electrode 1307 which is connected to the ground facing the shielding electrodes 1302*a* and 1302*b* and a common open end of the microstrip resonator electrodes 1304*a* and 1304*b*. An end face electrode 1308, which is provided on the front of the stacked dielectric substrates, is connected to short-circuit ends of the resonator electrodes 1304*a* and 1304*b* and to the shielding electrodes 1302*a* and 1302*b*. End face electrodes 1309*a* and 1309*b* at the left and right sides of the stacked dielectric substrates are connected to the input/output coupling electrodes 1305*a* and 1305*b* to constitute input/output terminals.

FIG. 22 is a circuit diagram of the second conventional RF device. The input/output coupling electrode 1305*a* and the resonator electrode 1304*a* constitute an input/output coupling capacitor 1401*a*, and the input/output coupling electrode 1305*b* and the resonator electrode 1304*b* constitute an input/output coupling capacitor 1401*b*. In addition, the input/output coupling electrode 1305*a* and the inter-stage coupling electrode 1303 constitute an inter-stage coupling capacitor 1402*a*, and the input/output coupling electrode 1305*b* and the inter-stage coupling electrode 1303 constitute an inter-stage coupling capacitor 1402*b*. These components constitute a two-stage band-pass filter shown in FIG. 22.

FIG. 23 is a block diagram of an antenna duplexer 1503, which is the second conventional RF device, comprising a transmitting filter 1501, a receiving filter 1502, the filters being constituted by the band-pass filter, and a matching circuit provided therebetween.

However, the first conventional RF device configured as described above, the transmitting filter 1206 and the receiving filter 1027 are composed of an inductor or capacitor with a low Quality factor, and therefore, have a high loss as a filter. Furthermore, the microstrip resonator structure for increasing the Quality factor has a problem in that the RF device including the substrate 1101 made of a low temperature cofired ceramic with low relative dielectric constant becomes quite large because the size of the resonator is inversely proportional to the frequency and the square root of the relative dielectric constant.

Even with the microstrip resonator structure, since it is also affected by the substrate 1101 with low relative dielectric constant, the Quality factor cannot be increased sufficiently, and for example, a circuit provided for the CDMA mode still has a problem of the filter loss.

In the second conventional RF device configured as described above, if a line is provided thereon or therein, the impedance of the line is increased because the substrates constituting the RF multilayered device are made of a low temperature cofired ceramic with high relative dielectric constant, and thus, it is quite difficult to form a complicated circuit in each substrate. In addition, it is also quite difficult to implement a discrete component, such as a discrete resistor, a discrete capacitor, a discrete inductor and a packaged semiconductor, on the second conventional RF device, because the line impedance of the discrete component itself is increased.

SUMMARY OF THE INVENTION

In view of the above described problems, an object of this invention is to provide an RF device having a low filter loss and not suffering from a problem about a line impedance, or a compact RF device not suffering from a problem about a line impedance.

One aspect of the present invention is an RF device, comprising:

a first substrate made of a material with a lower relative dielectric constant and having a high frequency circuit formed therein or on a surface thereof; and a second substrate made of a material with a higher relative dielectric constant, wherein at least a part of a filter is provided in, on a surface of or in the vicinity of said second substrate and connected to said high frequency circuit, and said high frequency circuit is composed of an element other than said part of the filter.

Another aspect of the present invention is the RF device, wherein said at least a part of the filter forms a high frequency circuit for a CDMA mode.

Still another aspect of the present invention is the RF device, wherein said second substrate is partially overlaid on said first substrate, a semiconductor device or passive device is provided on a region in the surface of said first substrate on which said second substrate is not overlaid, and a multilayered wiring pattern made of copper or silver is formed in said first substrate, whereby said high frequency circuit is formed.

Yet still another aspect of the present invention is the RF device, wherein said semiconductor device includes any one of a PIN diode device, a GaAs semiconductor device, a field effect transistor (FET) device and a varactor diode device, and switching among a plurality of frequency bands is realized by an operation of any one of said devices.

Still yet another aspect of the present invention is an RF device, comprising:

a first substrate made of a material with a lower relative dielectric constant and having a first high frequency circuit for a lower frequency band formed therein or on a surface thereof; and a second substrate made of a material with a higher relative dielectric constant, wherein at least a part of a filter of a second high frequency circuit for a higher frequency band is provided in, on a surface of or in the vicinity of said second substrate, and said first high frequency circuit and said second high frequency circuit are connected to each other.

A further aspect of the present invention is the RF device, wherein said second substrate is overlaid on said first substrate, and said part of the filter is sandwiched between said first substrate and said second substrate.

A still further aspect of the present invention is the RF device, wherein said second substrate is partially overlaid on said first substrate, a semiconductor device or passive device is provided on a region in the surface of said first substrate on which said second substrate is not overlaid, and a multilayered wiring pattern made of copper or silver is formed in said first substrate, whereby said first high frequency circuit is formed.

A yet further aspect of the present invention is the RF device, wherein said second substrate comprises a plurality of substrates disposed on said first substrate with spaced apart from each other, one of said plurality of substrates constitutes a transmitting filter, and another of said plurality of substrates constitutes a receiving filter.

A still yet further aspect of the present invention is the RF device, wherein said lower frequency band is a frequency band for a TDMA mode, and said higher frequency band is a frequency band for a CDMA mode.

An additional aspect of the present invention is the RF device, wherein each of said first and second substrates is composed of a multilayered and integrally molded ceramic.

A still additional aspect of the present invention is the RF device, wherein said first substrate is made of a low temperature cofired ceramic and said second substrate is made of a high temperature cofired ceramic.

A yet additional aspect of the present invention is the RF device, wherein a part of said filter is a resonator electrode, and said resonator electrode is constituted by a metal foil.

A still yet additional aspect of the present invention is the RF device, wherein the RF device is integrated by filling a space defined by said first substrate, said second substrate and said resonator electrode with a thermosetting resin.

A supplementary aspect of the present invention is the RF device, wherein said semiconductor device includes any one of a PIN diode device, a GaAs semiconductor device, a field effect transistor (FET) device and a varactor diode device, and switching between said first high frequency circuit and said second high frequency circuit is realized by an operation of any one of said devices.

A still supplementary aspect of the present invention is the RF device, wherein whole or a part of said second substrate is covered with a shielding electrode.

A yet supplementary aspect of the present invention is the RF device, wherein said passive device includes a SAW filter with an electrode hermetically sealed.

A still yet supplementary aspect of the present invention is a communication apparatus, comprising the RF device, a transmitting circuit, a receiving circuit and an antenna which are connected to said RF device.

DESCRIPTION OF SYMBOLS

Figure 1:
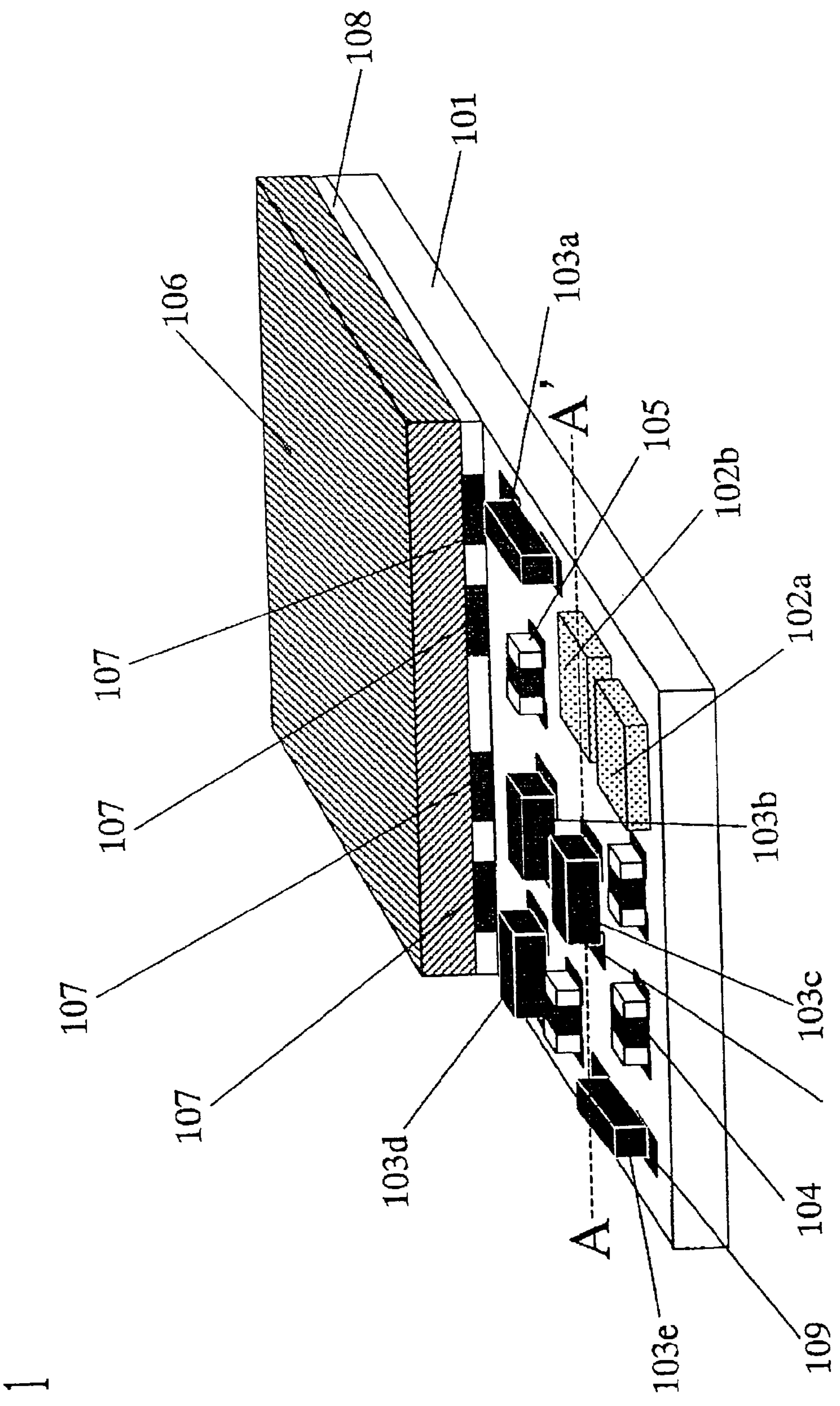
FIG. 1 is a perspective view of an RF device according to an embodiment 1 of this invention.

101 Low temperature cofired ceramic with low dielectric constant
102*a*, 102*b* SAW filter
103*a*, 103*b*, 103*c*, 103*d*, 103*e* PIN diode
104 Discrete inductor
105 Discrete capacitor
106 Ceramic with high dielectric constant
107 Metal foil resonator
108 Thermosetting resin
109 Upper external electrode
201 Multilayered wiring conductor
202 Interlayer via hole
203 Bottom surface terminal electrode (LGA)
301, 302 Switch circuit
303 Diplexer
304, 305 Internal terminal
306 Antenna terminal
307*a*, 307*b* LPF
308 Duplexer
401 Control terminal
402 Resistor
403 Control terminal
404 Resistor
405 Control terminal
406 Resistor
407 Transmitting filter
408 Receiving filter
409 Transmission line
410 Transmission line
411*a*, 411*b* Quarter-wavelength tip-short-circuited resonator
412 Inter-stage coupling capacitor
413*a*, 413*b* Input/output coupling capacitor
414*a*, 414*b* Quarter-wavelength tip-short-circuited resonator
415 Inter-stage coupling capacitor
416*a*, 416*b* Input/output coupling capacitor
501, 505 Resonator
506, 507 Series capacitor
508, 509 Ground capacitor
510, 512 Coupling inductor
513, 514 Coupling capacitor
515, 516 Bypass capacitor
517 Capacitor for matching between terminals
518 Inductor for matching between terminals
519, 520, 521, 522, 523 Switch
524, 525, 526, 527, 528 Switch coupling capacitor
529 Antenna terminal
530 Transmitting terminal
531 Receiving terminal
601 PIN diode
602 Coupling capacitor
603 Choke coil
604 Bypass capacitor
605 Resistor
606 Control terminal
701 Metal foil resonator
702 Low temperature cofired ceramic with low dielectric constant
703 Ceramic with high dielectric constant
704 Thermosetting resin
901 Field effect transistor (FET)
902 Bypass capacitor
903 Control terminal
1101 Low temperature cofired ceramic body with low dielectric constant
1102 Multilayered wiring conductor
1103 Interlayer via hole
1104 Discrete component
1201 Diplexer
1202 Send/receive switching circuit
1203 Send/receive switching circuit
1204 Duplexer
1205 Diode
1206*a*, 1206*b* Transmission line
1207 Transmitting filter
1208 Receiving filter
1301*a*, 1301*e* Dielectric substrate with high dielectric constant
1302*a*, 1302*b* Shielding electrode
1303 Inter-stage coupling electrode
1304*a*, 1304*b* Microstrip resonator electrode
1305*a*, 1305*b* Input/output coupling electrode
1306*a*, 1306*b* End face electrode
1307 End face electrode
1308 End face electrode
1309*a*, 1309*b* Input/output terminal
1401*a*, 1401*e* Input/output coupling capacitor
1402*a*, 1402*b* Inter-stage coupling capacitor

PREFERRED EMBODIMENTS OF THE INVENTION

Now, an RF device according to this invention will be described with reference to the drawings.

(Embodiment 1)

FIG. 1 is a perspective view of an RF device according to an embodiment 1 of this invention. A substrate 101 is an example of a first substrate according to this invention, which is made of a low temperature cofired ceramic with low dielectric constant (hereinafter, "low dielectric constant" means a lower relative dielectric constant) Reference numerals 102*a* and 102*b* denote a SAW filter, reference numerals 103*a* to 103*e* denote a PIN diode, which is one example of a semiconductor device according to this invention, reference numeral 104 denotes a discrete inductor, reference numeral 105 denotes a discrete capacitor, and a substrate 106 is an example of a second substrate according to this invention, which is made of a high temperature cofired ceramic with high dielectric constant (hereinafter, “high dielectric constant” means a higher relative dielectric constant). A metal foil resonator 107 is one example of a part of a resonator according to this invention. Reference numeral 108 denotes a thermosetting resin and reference numeral 109 denotes an upper surface external electrode.

Figure 5:
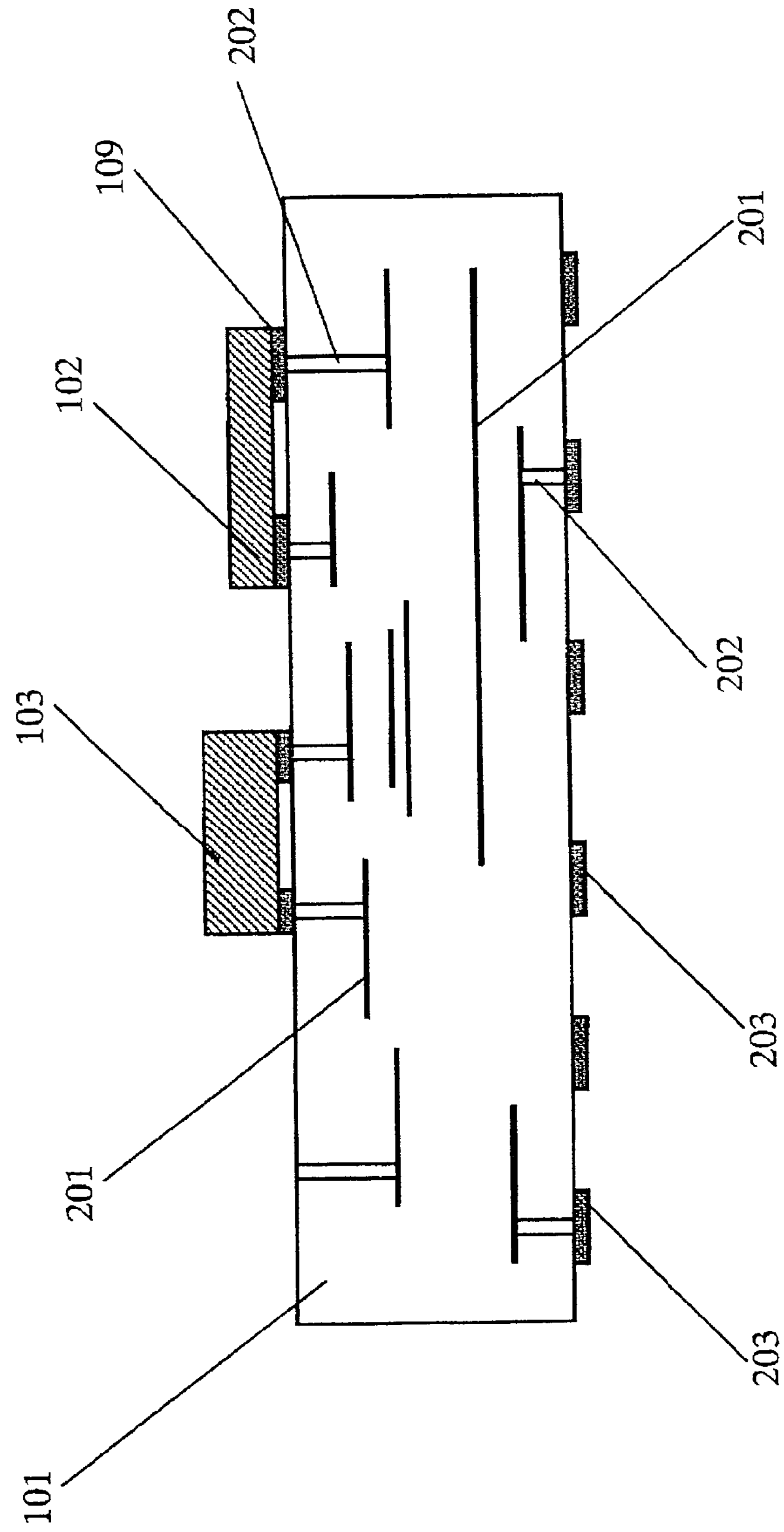
FIG. 5 is a cross-sectional view of the RF device taken along a line A–A' in FIG. 1.

FIG. 5 is a cross-sectional view of the RF device shown in FIG. 1 taken along a line A–A'. Reference numeral 201 denotes a multilayered wiring conductor, reference numeral 202 denotes an interlayer via hole, and reference numeral 203 denotes a bottom surface terminal electrode (LGA: Land Grid Array).

Figure 6:
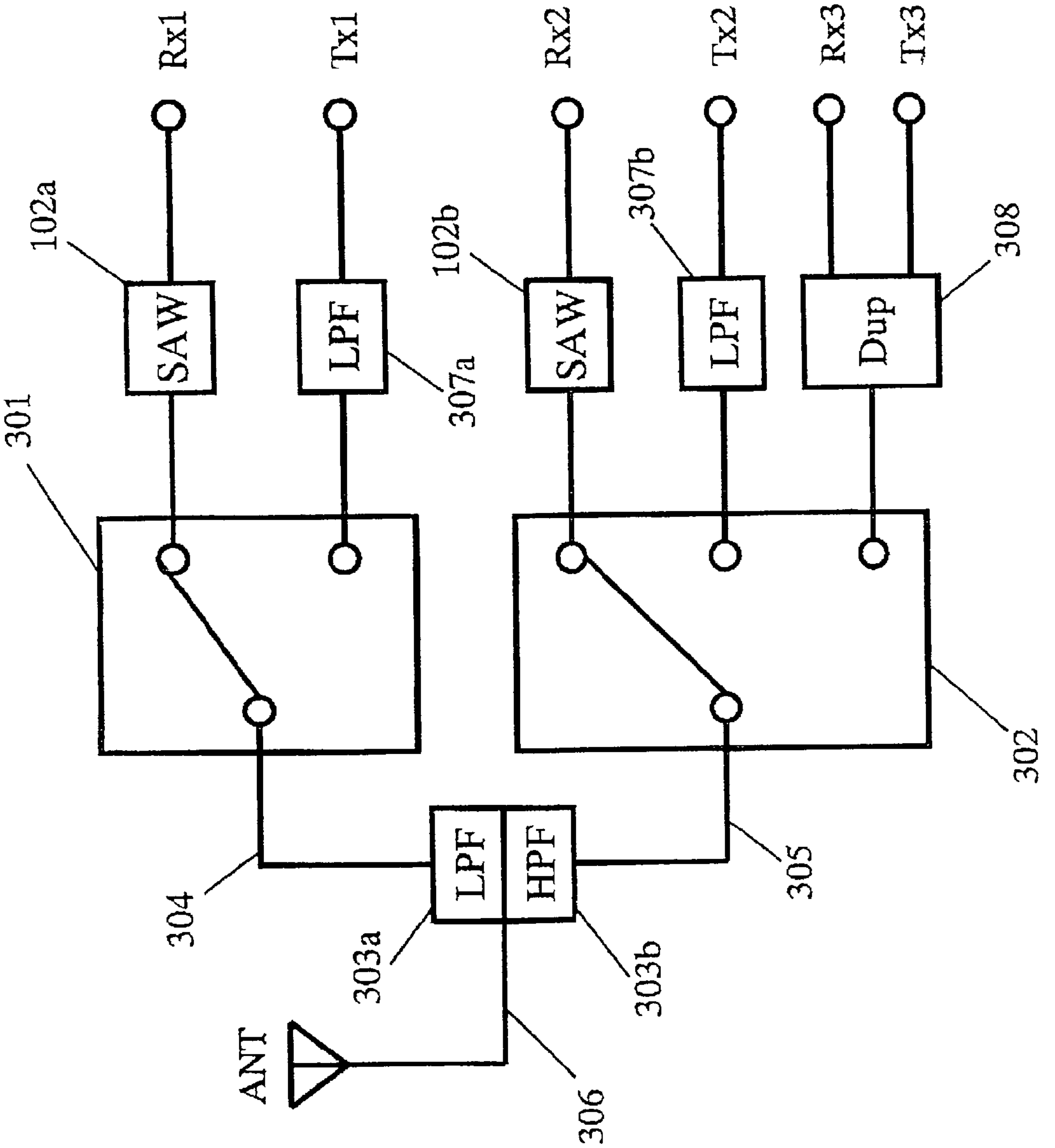
FIG. 6 is a block diagram of the RF device according to the embodiment 1 of this invention.

FIG. 6 is a block diagram of the RF device according to the embodiment 1 of this invention. Reference numerals 301 and 302 denote a switching circuit (send/receive switching circuit). Reference numeral 303 denotes a diplexer, and specifically, reference numeral 303*a* denotes a low pass filter (LPF) and reference numeral 303*b* denotes a high pass filter (HPF) Reference numerals 304 and 305 denote an internal terminal, reference numeral 306 denotes an antenna terminal, reference numerals 307*a* and 307*b* denote an LPF, and reference numeral 308 denotes a duplexer (Dup).

Figure 7:
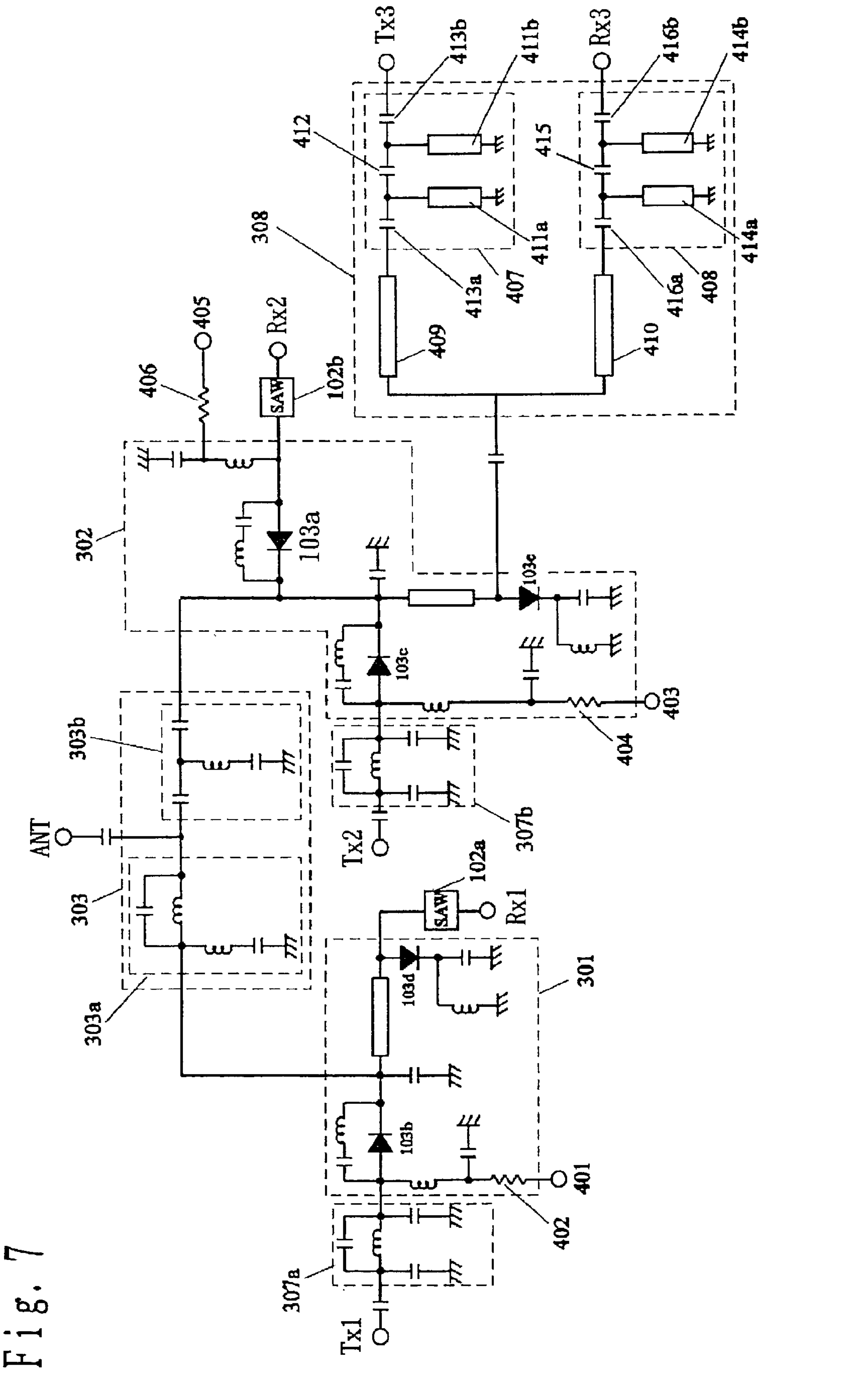
FIG. 7 is an equivalent circuit diagram of the RF device according to the embodiment 1 of this invention.

FIG. 7 is an equivalent circuit diagram of the RF device according to the embodiment 1 of this invention. Reference numeral 401 denotes a control terminal, reference numeral 402 denotes a resistor, reference numeral 403 denotes a control terminal, reference numeral 404 denotes a resistor, reference numeral 405 denotes a control terminal, reference numeral 406 denotes a resistor, reference numeral 407 denotes a transmitting filter, reference numeral 408 denotes a receiving filter, reference numerals 409 and 410 denote a transmission line, reference numerals 411*a* and 411*b* denote a quarter-wavelength tip-short-circuited resonator, reference numeral 412 denotes an inter-stage coupling capacitor, reference numerals 413*a* and 413*b* denote an input/output coupling capacitor, reference numeral 414*a* and 414*b* denote a quarter-wavelength tip-short-circuited resonator, reference numeral 415 denotes an inter-stage coupling capacitor, and reference numerals 416*a* and 416*b* denote an input/output coupling capacitor.

In the substrate 101 made of a low temperature cofired ceramic with low dielectric constant, the multilayered wiring conductor 201 made of copper or silver, which is one example of the multilayered wiring pattern according to this invention, forms strip lines including the transmission lines 409, 410 with an impedance determined by thickness, width and length of the multilayered wiring conductor 201 and the dielectric constant of the substrate 101. In addition, the multilayered wiring conductors 201 disposed in different two layers form a capacitor in the substrate 101, the capacitor having an impedance determined by an overlapping area of the multi layered wiring conductors 201, the dielectric constant of the low temperature cofired ceramic with low dielectric constant sandwiched between the multilayered wiring conductors 201 or the like.

Since the substrate 101 made of the low temperature cofired ceramic with low dielectric constant is interposed between the multilayered wiring conductors 201 and the metal foil resonators 107, capacitors including the inter-stage coupling capacitors 412, 415 and the input/output coupling capacitors 413*a*, 413*b*, 416*a* and 416*b* are formed.

In addition, in the substrate 101, the multilayered wiring conductor 201 forms an inductor having an impedance determined by width and length of the line of the multilayered wiring conductor 201 and the dielectric constant of the low temperature cofired ceramic with low dielectric constant.

The multilayered wiring conductors 201 are electrically connected to each other via the interlayer via hole 202 formed at a desired position between the multilayered wiring conductors 201. A pattern of the multilayered wiring conductor 201 in each layer is formed by screen printing or another method. The interlayer via hole 202 is formed by punching a hole in the dielectric sheet constituting the substrate 101 and filling the hole with a conductive paste by printing or another method. External connection terminals including the antenna terminal 306, transmitting terminals Tx1, Tx2 and Tx3, receiving terminals Rx1, Rx2 and Rx3 and control terminals 401, 403 and 405 are formed in the form of the bottom surface terminal electrode 203 disposed on the bottom surface of the substrate 101 via the strip line, the interlayer via hole 202 or the like.

On the upper surface of the substrate 101 made of the low temperature cofired ceramic with low dielectric constant, the substrate 106, which is one example of the second substrate according to this invention, made of a high temperature cofired ceramic with high dielectric constant and having a smaller area than the substrate 101 is disposed. Between the substrates 101 and 106, there is sandwiched a plurality of metal foil resonators 107 mainly made of gold, silver or copper, each of which is one example of a resonator electrode which is apart of the resonator according to this invention. Spaces between the metal foil resonators 107 are filled with the thermosetting resin 108, whereby the substrates 101 and 106 are interconnected and integrated.

The electrode 109, which is drawn to the upper surface of the substrate 101 via the interlayer via hole 202, is formed on the upper surface of the substrate 101 in a region where the metal foil resonator 107 and the substrate 106 are not formed. Devices which are difficult to form in the substrate 101, such as the two SAW filters 102, the five PIN diodes 103 and the discrete components including the discrete inductor 104 and the discrete capacitor 105, are mounted and electrically connected to the internal circuit in the stack assembly via the respective upper surface external electrodes 109 formed on the upper surface of the stack assembly.

As described above, in the circuit shown in FIG. 7, the duplexer 308 is shown as an example of a second high frequency circuit according to this invention, and the part other than the duplexer 308 is shown as an example of a first high frequency circuit according to this invention.

Figure 8:
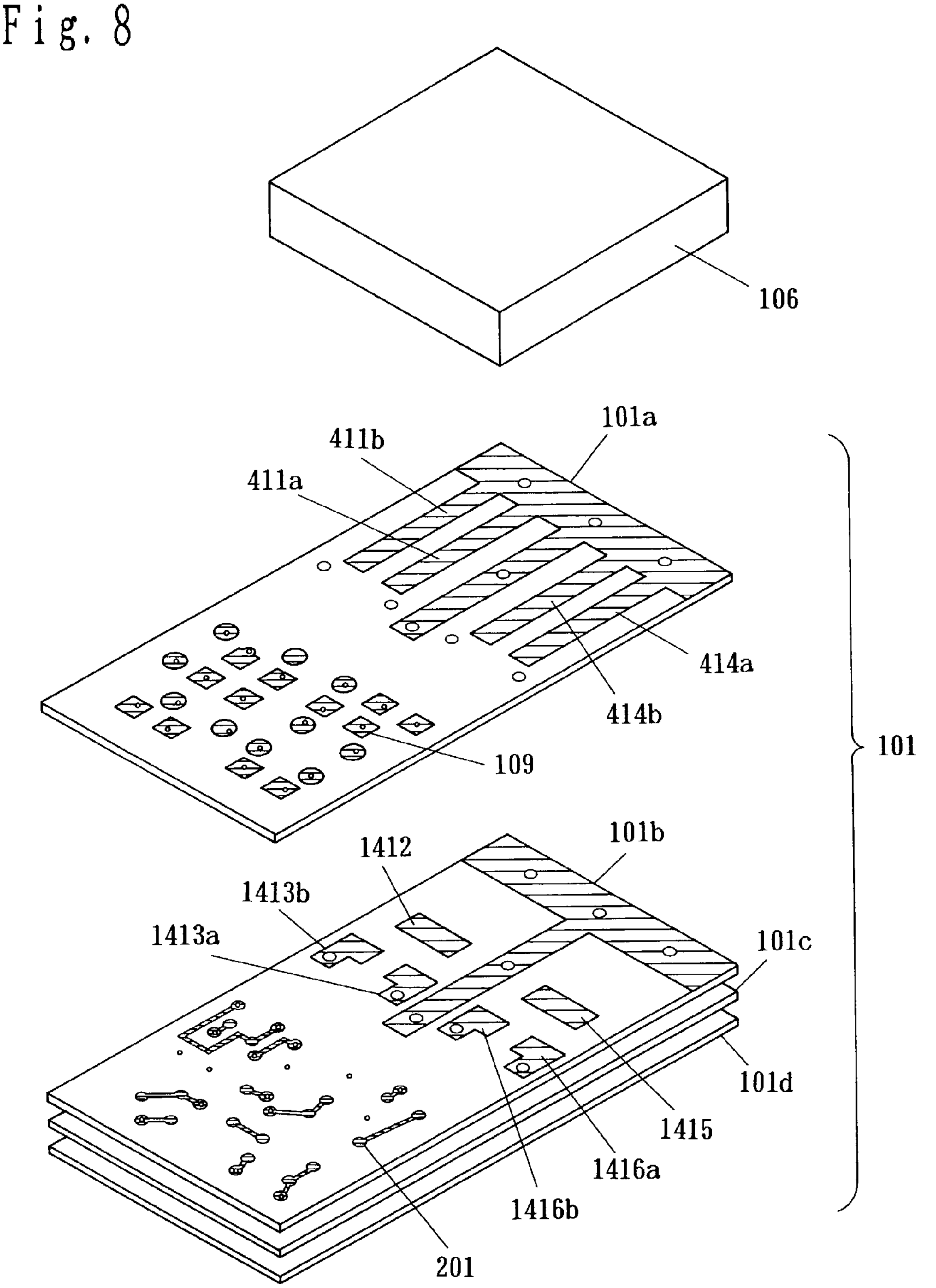
FIG. 8 is a perspective view of the RF device according to the embodiment 1 of this invention.

FIG. 8 shows an arrangement of electrodes 1413*a*, 1413*b*, 1416*a*, 1416*b*, 1412 and 1415, each of which constitutes a part of the input/output coupling capacitors 413*a*, 413*b*, 416*a* and 416*b* and inter-stage coupling capacitors 412 and 415, when forming the transmitting filter 407 and the receiving filter 408 from the substrate 106, the metal foil resonator 107 and the multilayered wiring conductor in the substrate 101.

Now, a circuit configuration of the RF device according to the embodiment 1 of this invention will be described.

The RF device according to the embodiment 1 of this invention is an RF device provided for triple bands having a filtering capability of passing therethrough transmitting frequency bands and receiving frequency bands of a first frequency band (EGSM), a second frequency band (DCS) and a third frequency band (UMTS), the first and second frequency bands being examples of a lower frequency band of this invention, and the third frequency band being an example of a higher frequency band of this invention. The RF device comprises the switch circuits (send/receive switching circuits) 301 and 302 and the diplexer 303.

The diplexer 303 has the LPF 303*a* that is connected between the internal terminal 304 and the antenna terminal 306 to be connected to the antenna (ANT) and passes therethrough the first frequency band (EGSM), and the HPF 303*b* that is connected between the internal terminal 305 and the antenna terminal 306 and passes therethrough the second frequency band (EGSM) and the third frequency band (UMTS).

The switch circuit 301 is switching means that is connected to the internal terminal 304 and switches between the transmitting terminal Tx1 and receiving terminal Rx1 for the first frequency band (EGSM) branched by the LPF 303*a* under the control of the control terminal 401. The LPF 307*a* for reducing a harmonic distortion caused by amplification when transmitting via the transmitting terminal Tx1 is inserted between the switch circuit 301 and the transmitting terminal Tx1. In addition, the SAW filter 102*a* for reducing an undesired frequency component of a signal inputted through the antenna ANT when receiving via the receiving terminal Rx1 is inserted between the switch circuit 301 and the receiving terminal Rx1.

The switch circuit 302 is switching means that is connected to the internal terminal 305 and switches among the transmitting terminal Tx2 and receiving terminal Rx2 for the second frequency band (DCS) branched by the HPF 303*b* and the duplexer 308 for the third frequency band (UMTS) under the control of the control terminals 403 and 405. The low pass filter (LPF) 307*b* for reducing a harmonic distortion caused by amplification when transmitting via the transmitting terminal Tx2 is inserted between the switch circuit 302 and the transmitting terminal Tx2. In addition, the SAW filter 102*b* for reducing an undesired frequency component of a signal inputted through the antenna ANT when receiving via the receiving terminal Rx2 is inserted between the switch circuit 302 and the receiving terminal Rx2. The duplexer 308 is means of branching a signal in the third frequency band (UMTS) received via the switch circuit 302 to the transmitting terminal Tx3 and receiving terminal Rx3 for the third frequency band (UMTS).

A communication mode for the first frequency band (EGSM) and the second frequency band (DCS) is the TDMA (Time Division Multiple Access) mode. One example of the lower frequency band according to this invention is a frequency band for the TDMA mode. In this case, switching between the transmitting terminals Tx1, Tx2 and the receiving terminals Rx1, Rx2 is accomplished by means of an external diode. A communication mode for the third frequency band (UMTS) is the CDMA (Code Division Multiple Access) mode. One example of the higher frequency band according to this invention is a frequency band for the CDMA mode. The transmitting terminal Tx3 and the receiving terminal Rx3 are provided via the duplexer 308.

The duplexer 308 is composed of the transmitting filter 407, the receiving filter 408 and the transmission lines 409, 410 having an optimum electrical length and connected to the filters. For example, the transmitting filter 407 is a two-stage band pass filter (BPS) composed of the two quarter-wavelength tip-short-circuited resonators 411*a* and 411*b*, the inter-stage coupling capacitor 412 disposed therebetween, and the input/output coupling capacitors 413*a* and 413*b* disposed at the input side and output side thereof.

Similarly, the receiving filter 408 is a two-stage BPS composed of the two quarter-wavelength tip-short-circuited resonators 414*a* and 414*b*, the inter-stage coupling capacitor 415, and the input/output coupling capacitors 416*a* and 416*b*. Here, the quarter-wavelength tip-short-circuited resonator 411*a*, 411*b*, 414*a* and 414*b* constituting the transmitting filter 407 and the receiving filter 408 shown in FIG. 7 are equivalent to the metal foil resonators 107 shown in FIG. 1.

The inter-stage coupling capacitors 412 and 415 and the input/output coupling capacitors 413*a*, 413*b*, 416*a* and 416*b* constituting the transmitting filter 407 and the receiving filter 408 are each composed of the multilayered wiring conductor 201 in the substrate 101 and the metal foil resonator 107. Devices which are difficult to form in the substrate 101, such as the diodes 103*a* to 103*e*, and SAW filters 102*a* and 102*b*, are mounted on the substrate 101, and the strip lines, capacitors and inductors, which can be formed in the substrate 101, are formed in the substrate 101, whereby the complicated RF device can be made compact.

In addition, since the metal foil resonator 107, which has high conductivity and less irregularity, is used as the resonator, a Quality factor Qc associated with a conductor loss is enhanced. Therefore, a filter or duplexer having a high Quality factor representing the performance of the filter and low loss can be realized. The Quality factor is expressed by the following formula 1 using the Quality factor Qc associated with the conductor loss, a Quality factor Qd associated with a dielectric loss and a Quality factor Qr associated with a radiation loss.

$$1/Q=1/Qc+1/Qd+1/Qr \quad \text{(Formula 1)}$$

Furthermore, according to the embodiment 1, on the upper surface of the metal foil resonator 107, there is provided the substrate 106 made of a high temperature cofired ceramic with high dielectric constant, which has a higher dielectric loss Qd, rather than the substrate 101 made of the low temperature cofired ceramic with low dielectric constant. Thus, the Quality factor of the resonator can be further enhanced. In addition, as the dielectric constant is increased, the length of the resonator can be reduced. Thus, the size of the RF device can be reduced compared to the case where it is formed using only the ceramic with low dielectric constant. Thus, a filter or duplexer having low loss and reduced size can be realized.

As described above, the duplexer 308 or filters 407, 408 composed of the substrates 101 and 106 with different dielectric constants and areas and the metal foil resonator 107 formed therebetween, the multilayered RF switches composed of the external components, such as the PIN diodes, formed in the substrate 101 made of the low temperature cofired ceramic with low dielectric constant and on the upper surface thereof, and the like are integrated, whereby the compact RF device with low loss capable of supporting the different communication modes, that is, the TDMA and CDMA modes can be realized.

In the description of this embodiment, the transmitting filter 407 and the receiving filter 408 constituting the duplexer 308 are the two-stage BPFs. However, the filters maybe an LPF or band elimination filter (BEF). Furthermore, the number of stages is not limited to two, and may be changed appropriately for a desired characteristic.

In addition, shielding can be enhanced by providing a ground electrode GND on the whole or part of the surface of the substrate 106 made of the high temperature cofired ceramic with high dielectric constant.

In the above description, the metal foil resonator 107 is used as an example of the resonator electrode according to this invention. However, instead of the metal foil resonator 107, a printed electrode formed by screen printing or the like can also enhance the dielectric loss Qd due to the substrate 106 made of the high temperature cofired ceramic with high dielectric constant, and thus, a filter or duplexer with low loss can be realized.

In the above description, the substrate 106 made of the high temperature cofired ceramic with high dielectric constant is provided on the upper surface of the metal foil resonator 107 to enhance the dielectric loss Qd. However, the substrate 106 may be made of the low temperature cofired ceramic with high dielectric constant to enable an electrode to be formed in the substrate 106 by screen printing or the like as in the case of the substrate 101.

Figure 14:
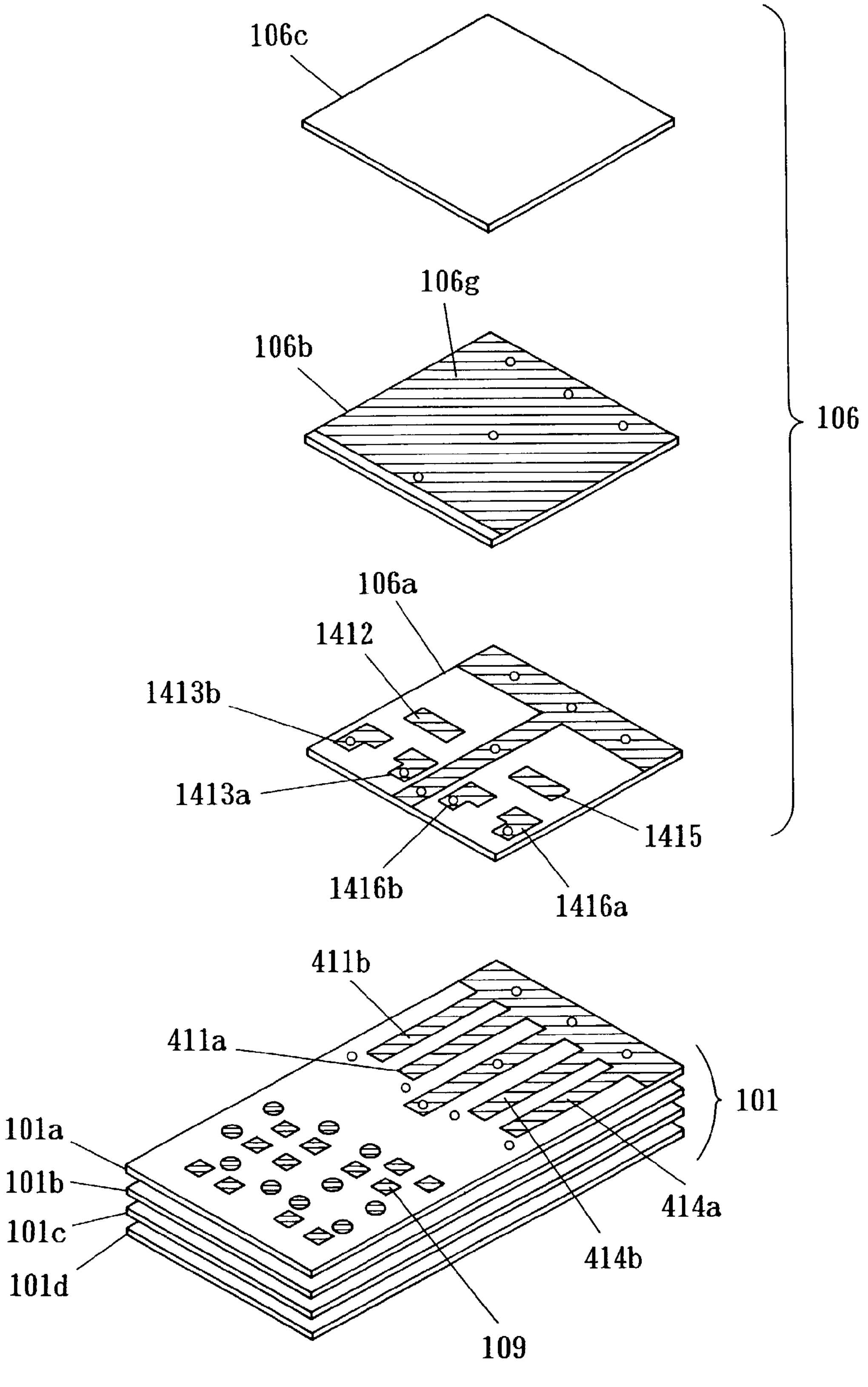
FIG. 14 is a perspective view of the RF device according to the embodiment 1 of this invention.

FIG. 14 shows an arrangement example in such a case. The substrate 106 shown in FIG. 14 is composed of stacked substrates 106*a*, 106*b* and 106*c* each made of the low temperature cofired ceramic with high dielectric constant. On a surface of the substrate 106*b*, there is formed a ground electrode 106*g*. On a surface of the substrate 106*a*, there are formed by screen printing input/output coupling capacitors 413*a*, 413*b*, 416*a* and 416*b* and electrodes 1413*a*, 1413*b*, 1416*a*, 1416*b*, 1412 and 1415, each of which constitutes a part of the inter-stage coupling capacitors 412 and 415. In this case, the input/output coupling capacitors 413*a*, 413*b*, 416*a* and 416*b* and the inter-stage coupling capacitors 412 and 415, each of which is an example of a part of the filter according to this invention, are formed on a surface of or in the substrate 106 made of the low temperature cofired ceramic with high dielectric constant. In the RF device thus configured, the low temperature cofired ceramic with high dielectric constant serves as the dielectric of the input/output coupling capacitors 413*a*, 413*b*, 416*a* and 416*b* and the inter-stage coupling capacitors 412 and 415. Therefore, the size of the capacitors can be reduced, so that the whole size of the RF device can be reduced.

In addition, in this case, the Quality factors of the inter-stage coupling capacitors 412 and 415 and input/output coupling capacitors 413*a*, 413*b*, 416*a* and 416*b* can be enhanced, so that the filters 407 and 408 can be reduced in loss.

In FIG. 14, the substrate 106 is shown to be composed of three layers having the electrodes printed thereon, and the substrate 101 is shown to be composed of four layers having the electrodes printed thereon. However, regardless of the number of the layers having the electrodes printed thereon, the same effect can be attained.

Figure 15:
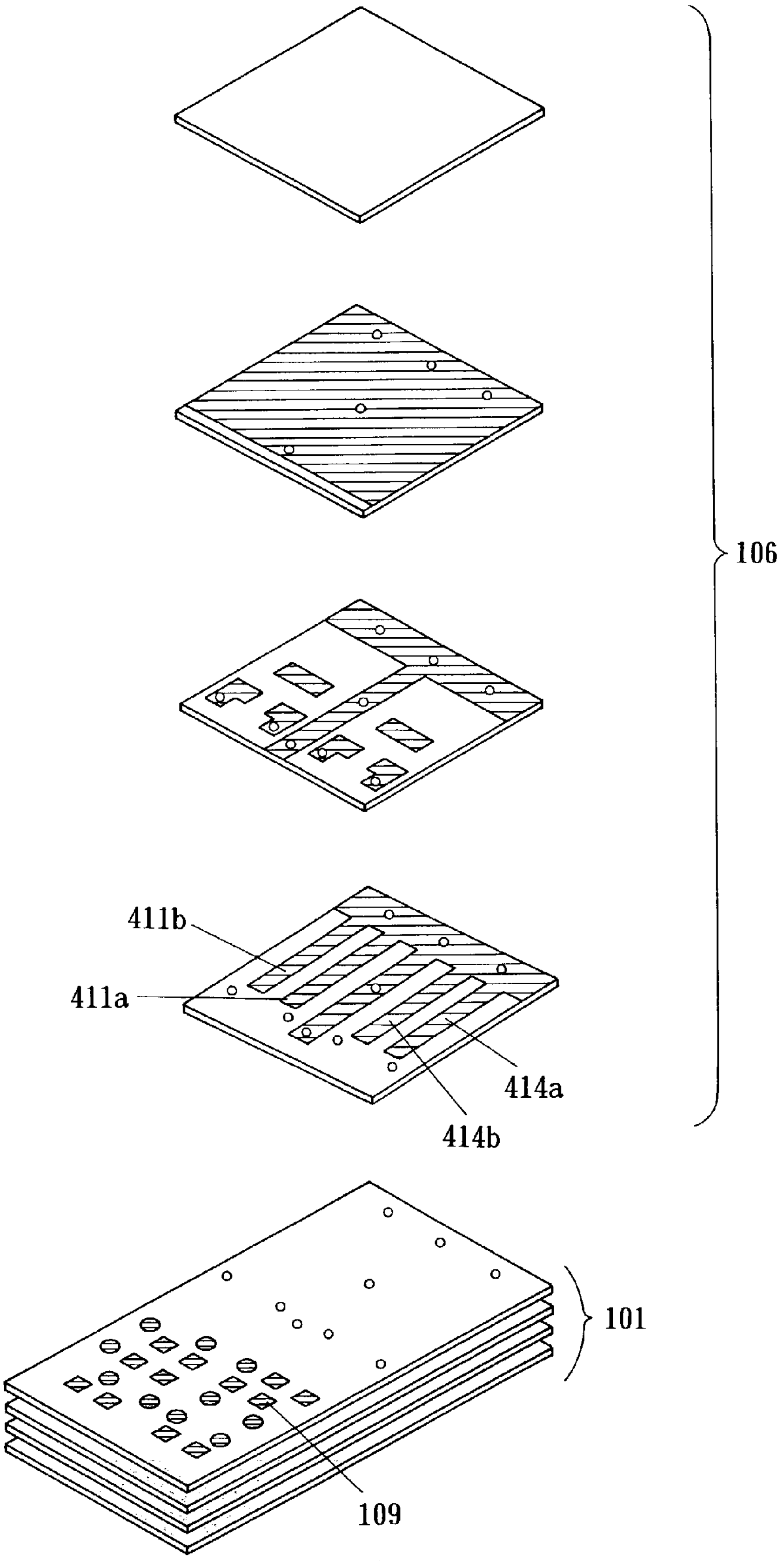
FIG. 15 is a perspective view of the RF device according to the embodiment 1 of this invention.

In addition, the resonator electrodes (that is, the tip-short-circuited resonators 411*a*, 411*b*, 414*a* and 414*b*) may be formed in the substrate 106 made of a ceramic with high dielectric constant. FIG. 15 shows an arrangement example in such a case. Such an arrangement also can attain the same effect as described above.

Figure 16:
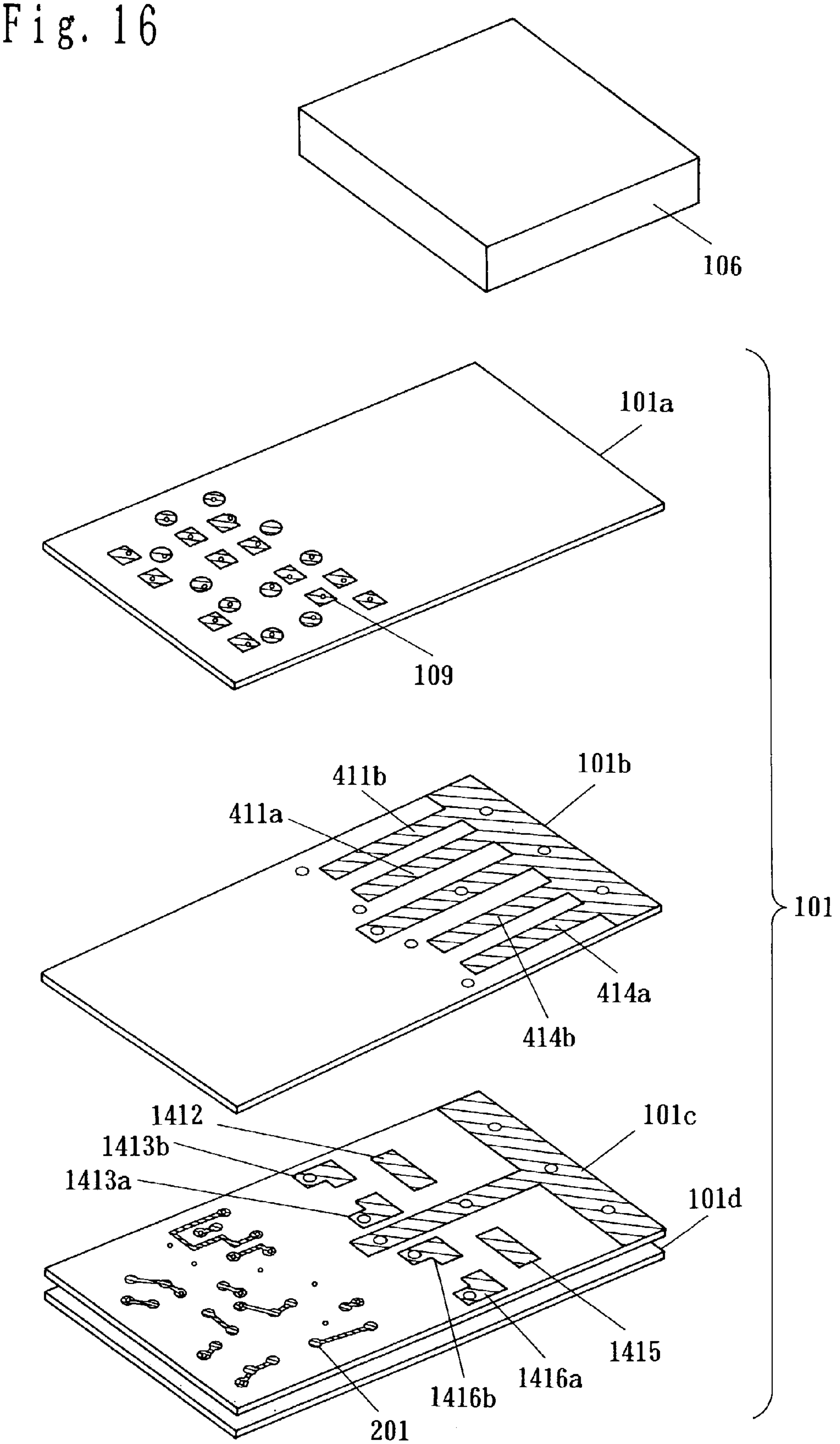
FIG. 16 is a perspective view of the RF device according to the embodiment 1 of this invention.

Furthermore, the resonator electrodes may be disposed in the vicinity of the substrate 106, rather than on the surface or in the substrate 106. FIG. 16 shows an arrangement in such an example, in which the tip-short-circuited resonators 411*a*, 411*b*, 414*a* and 414*b* are disposed in the substrate 101. The substrate 101 shown in FIG. 16 is composed of stacked substrates 101*a*, 101*b*, 101*c* and 101*d* each made of the low temperature cofired ceramic with low dielectric constant. Also in the case where the tip-short-circuited resonators 411*a*, 411*b*, 414*a* and 414*b* are disposed in the substrate 101 and are not in contact with the substrate 106 in this way, if the substrate 101*a* is thin so that the resonators can be affected by the substrate 106, the same effect as described above can be attained even though the resonator electrodes are disposed in the vicinity of the substrate 106.

In the above description, the tip-short-circuited resonator electrodes 411*a*, 411*b*, 414*a* and 414*b* serve as the resonator electrodes. Of course, however, a tip-opened half-wavelength resonator may attain the same effect.

In the above description, the PIN diodes are used in the switch circuit 301 for switching between the transmitting terminal Tx1 and receiving terminal Rx1 for the first frequency band (EGSM) and the switch circuit 302 for switching among the transmitting terminal Tx2, receiving terminal Rx2 for the second frequency band (DCS) and the duplexer 308 for the third frequency band (UMTS). Of course, however, a switching device, such as a GaAs semiconductor, a field effect transistor and a varactor diode, may attain the same effect.

Furthermore, in this embodiment, the RF device provided for triple bands for three systems, that is, EGSM, DCS and UMTS systems has been described. However, it is obvious that this invention is not limited thereto and this invention includes any arrangement in which the substrate 101 made of a material with a lower dielectric constant having a first high frequency circuit for a lower frequency band formed therein or on a surface thereof and at least part of a resonator of a second high frequency circuit for a higher frequency band are provided on a surface of the substrate 106, and the first and second high frequency circuits are connected to each other.

Furthermore, in the description of the embodiment 1, the first high frequency circuit for a lower frequency band is formed in the first substrate and the second high frequency circuit for a higher frequency band is formed in the second substrate. However, as far as no problem of the line impedance arises, the first high frequency circuit for a lower frequency band may be formed in the second substrate (for example, substrate 106) and the second high frequency circuit for a higher frequency band may be formed in the first substrate (for example, substrate 101). In this case, each component of the first high frequency circuit formed in the second substrate can provide a high Quality factor, and thus, if the first high frequency circuit constitutes a filter, the loss thereof can be reduced.

In addition, the first to third frequency bands should not be limited to those described above. For example, the third frequency band may be a frequency band (800 MHz band) provided for the CDMA-One (R) mode, and the first and second frequency bands may be provided for the PDC mode and the PHS mode, respectively. That is, if the third frequency band is lower than the first or second frequency band, the same effect can be attained. Here, of course, the first to third frequency bands may be provided for modes other than those described above.

(Embodiment 2)

Now, an RF device according to a second embodiment of this invention will be described with reference to the drawings.

Figure 9:
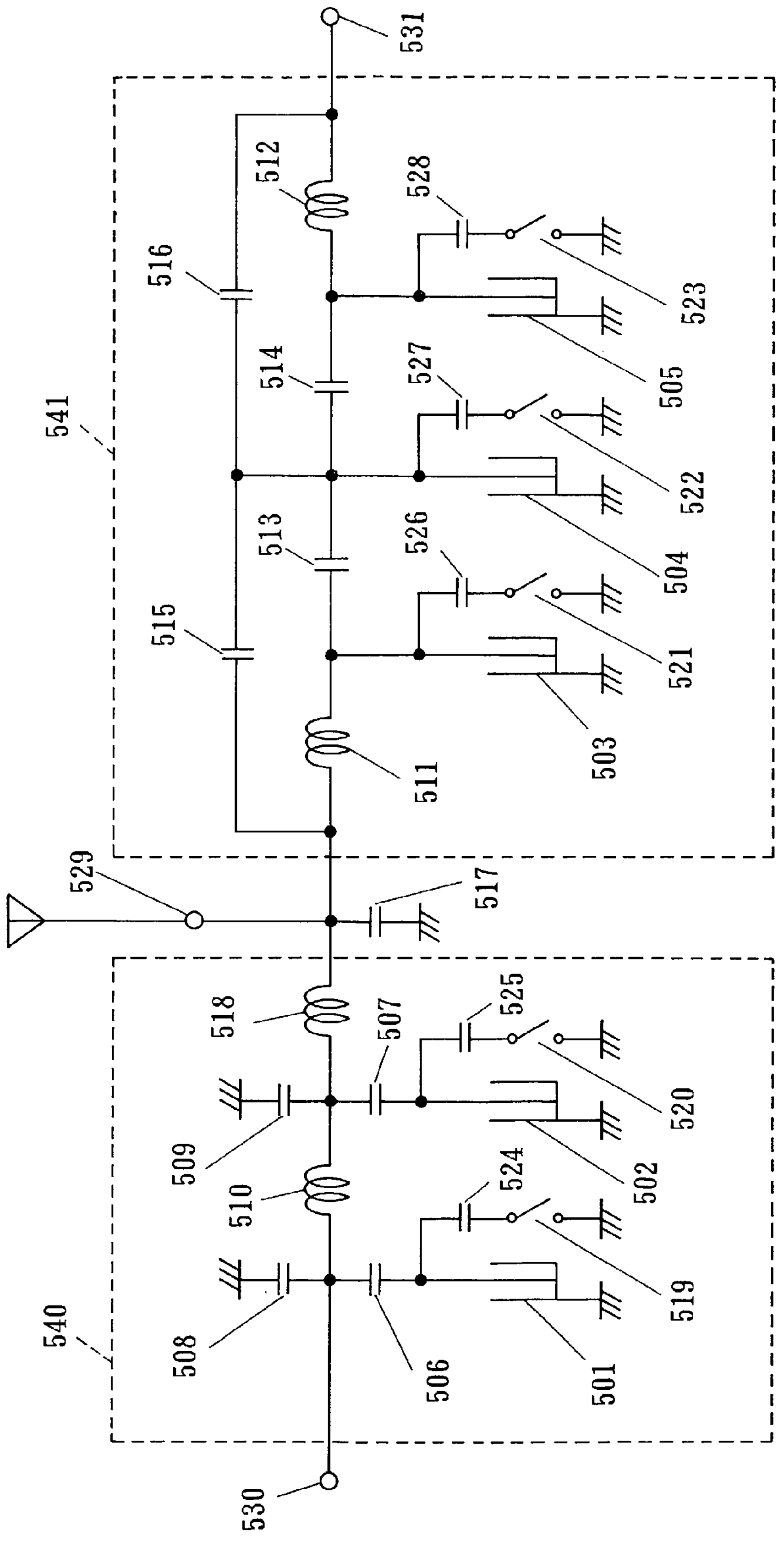
FIG. 9 is an equivalent circuit diagram of the RF device according to an embodiment 2 of this invention.

FIG. 9 is a circuit diagram of the RF device according to the embodiment 2 of this invention. In FIG. 9, reference numerals 501 to 505 denote a metal foil resonator serving as the quarter-wavelength tip-short-circuited resonator, reference numerals 506, 507 denote a series capacitor, reference numerals 508, 509 denote a ground capacitor, reference numerals 510 to 512 denote a coupling inductor, reference numerals 513, 154 denote a coupling capacitor, reference numerals 515, 516 denote a bypass capacitor, reference numeral 517 denotes a capacitor for matching between terminals, reference numeral 518 denotes an inductor for matching between terminals, reference numerals 519 to 523 denotes a switch, reference numerals 524 to 528 denote a switch coupling capacitor, reference numeral 529 denotes an antenna terminal, reference numeral 530 denotes a transmitting terminal, and reference numeral 531 denotes a receiving terminal.

The series capacitors 506 and 507 are connected to open ends of the resonators 501 and 502, respectively, and the resonators 501 and 502 are connected to each other by the inductor 510, thereby forming a transmitting filter 540. The coupling inductor 510 has the ground capacitors 508 and 509 connected to the ends thereof for suppressing harmonics. On the other hand, the resonators 503, 504 and 505 are coupled with each other by the capacitors 513 and 514. The input/output coupling inductors 511 and 512 are connected to open ends of the resonators 503 and 505, respectively, whereby a receiving band pass filter 541 is formed In addition, the bypass capacitor 515 bridging the coupling elements 511 and 513 and the bypass capacitor 516 bridging the coupling elements 512 and 514 provide an attenuation pole at a frequency higher than the pass band.

An output terminal of the transmitting filter 540 and an input terminal of the receiving band pass filter 541 are connected to the antenna terminal 529 via the series inductor 518 and the parallel capacitor 517 both for matching between terminals. The switches 519, 520, 521, 522 and 523 are connected to open ends of the resonators 501, 502, 503, 504 and 505 via the switch coupling capacitors 524, 525, 526, 527 and 528, respectively. The other ends of the switches are all grounded. In this way, the transmitting filter 540, the receiving band pass filter 541, the transmitting terminal 530, the receiving terminal 531 and the antenna terminal 529 constitute the RF device.

Figure 10:
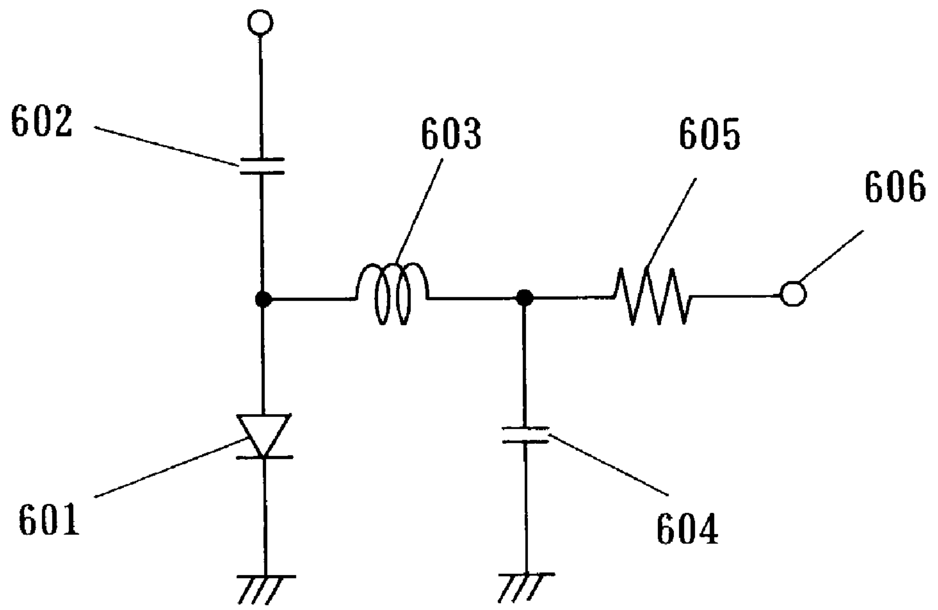
FIG. 10 illustrates a switch circuit, including a PIN diode, of the RF device according to the embodiment 2 of this invention.

FIG. 10 shows a specific circuit arrangement of the switches 519 to 523 including a PIN diode. Reference numeral 601 denotes a PIN diode. The PIN diode 601 is serially connected to a coupling capacitor 602 for blocking a direct current (equivalent to the capacitors 524 to 528 in FIG. 9) to form a frequency shift circuit. A control terminal 606 is connected to the connection between the PIN diode 601 and the coupling capacitor 602 via a resistor 605, a bypass capacitor 604 and a choke coil 603. A shift voltage is applied to the control terminal 606 to control the switching among bands.

That is, the shift voltage applied to the control terminal 606 is intended to turn on or off the PIN diode 601. If a certain positive voltage (shift voltage) higher than a bias voltage applied to a cathode of the PIN diode 601 is applied to the control terminal 606, a resistance of the PIN diode 601 in the forward direction becomes quite low, so that a current flows in the forward direction, and thus, the PIN diode 601 is turned on. The resistor 605 is to control the current value of the PIN diode 601 when it is in the on state. To the contrary, if a voltage of 0 volts or a reverse bias voltage is applied to the control terminal 606, the resistance of the PIN diode 601 in the forward direction becomes quite high, so that no current flows in the forward direction, and thus, the PIN diode 601 is turned off.

Figure 11:
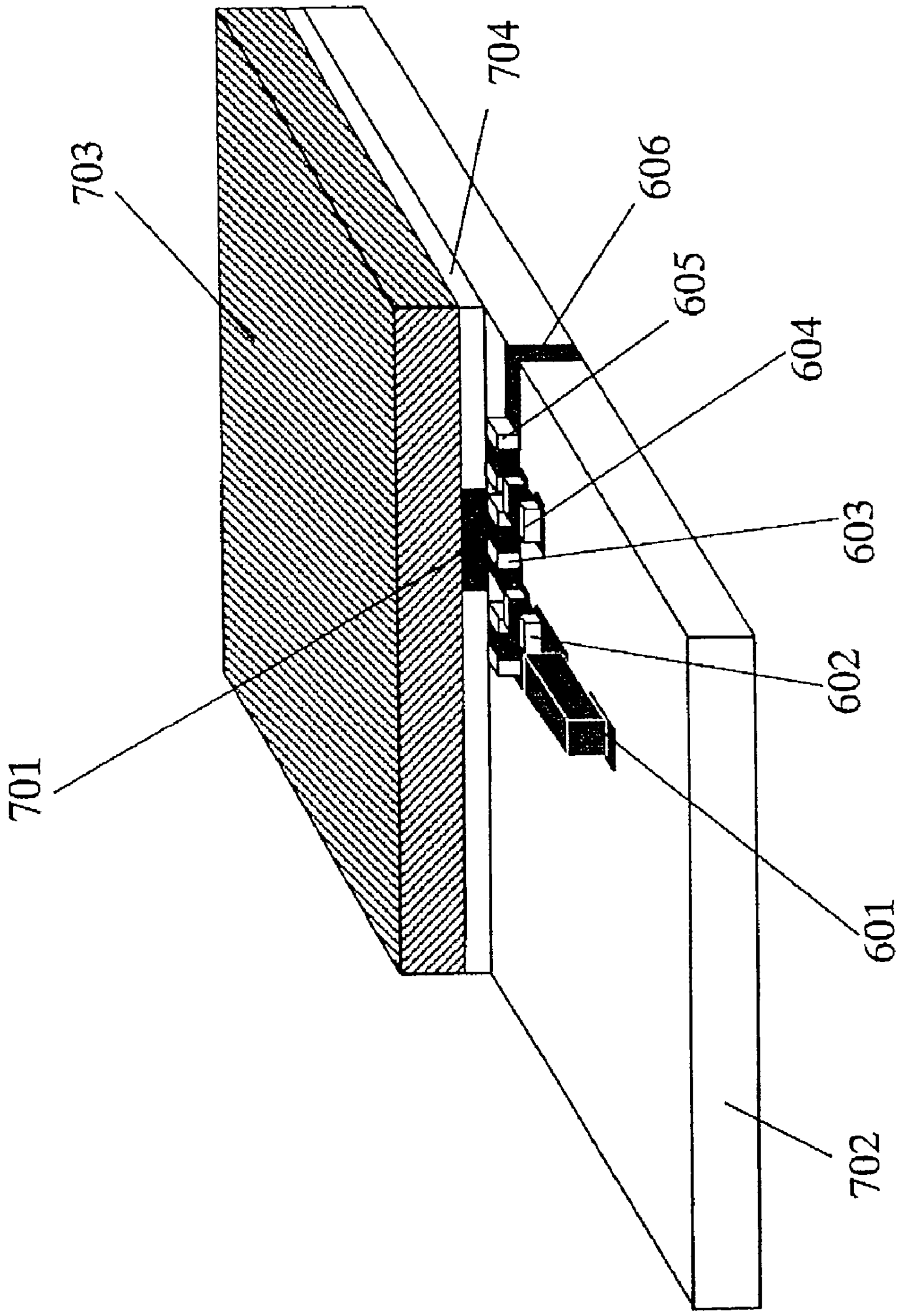
FIG. 11 is a partial perspective view of the RF device according to the embodiment 2 of this invention.

FIG. 11 is a partial perspective view of the RF device according to the embodiment 2 of this invention, in which the same parts as in FIG. 10 are assigned the same reference numerals. Reference numeral 701 denotes a metal foil resonator, reference numeral 702 denotes a substrate made of a ceramic with low dielectric constant, which is an example of the first substrate according to this invention, reference numeral 703 denotes a substrate made of a ceramic with high dielectric constant, which is an example of the second substrate according to this invention, and reference numeral 704 denotes a thermosetting resin.

A plurality of metal foil resonators 701 are equivalent to the resonators 501 to 505, and the metal foil resonators 701 are interposed between a lower substrate 702 and an upper substrate 703. Spaces between the metal foil resonators 701 are filled with the thermosetting resin 704, which interconnects and integrates the substrates 702 and 703. The components constituting the RF device according to the second embodiment of this invention except for the resonators 501 to 505, such as capacitors, inductors and switches, are mounted on the substrate 702 made of the ceramic with low dielectric constant.

That is, the high frequency circuit is formed in or on a surface of the substrate 702 except for a part of the filter (that is, the metal foil resonators), and the metal foil resonators 701, each of which is an example of at least part of the filter according to this invention, are formed on a surface of the substrate 703.

Figure 12:
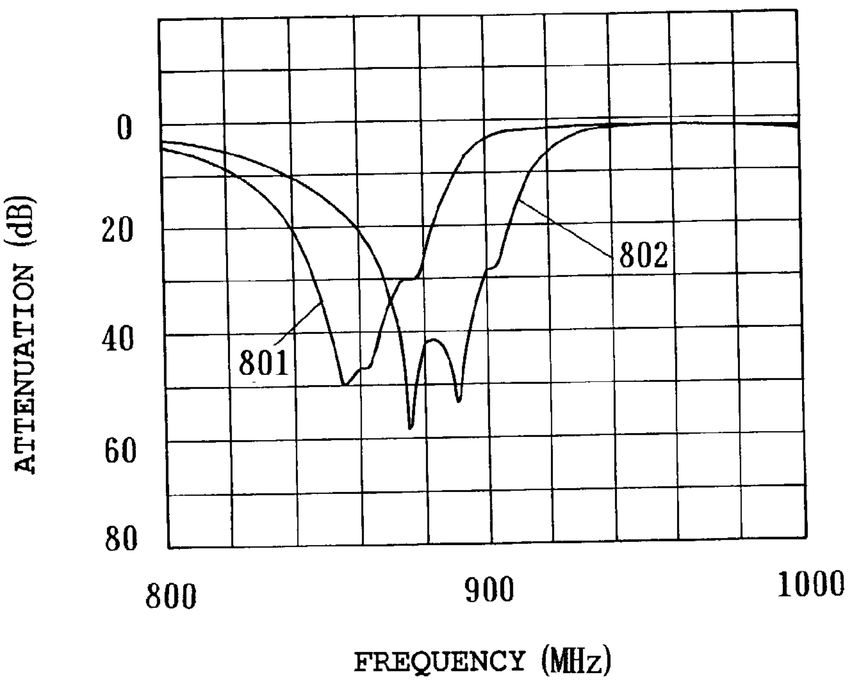
FIGS. 12*a* and 12*b* are graphs showing a transfer characteristic of the RF device according to the embodiment 2 of this invention.
Figure 12:
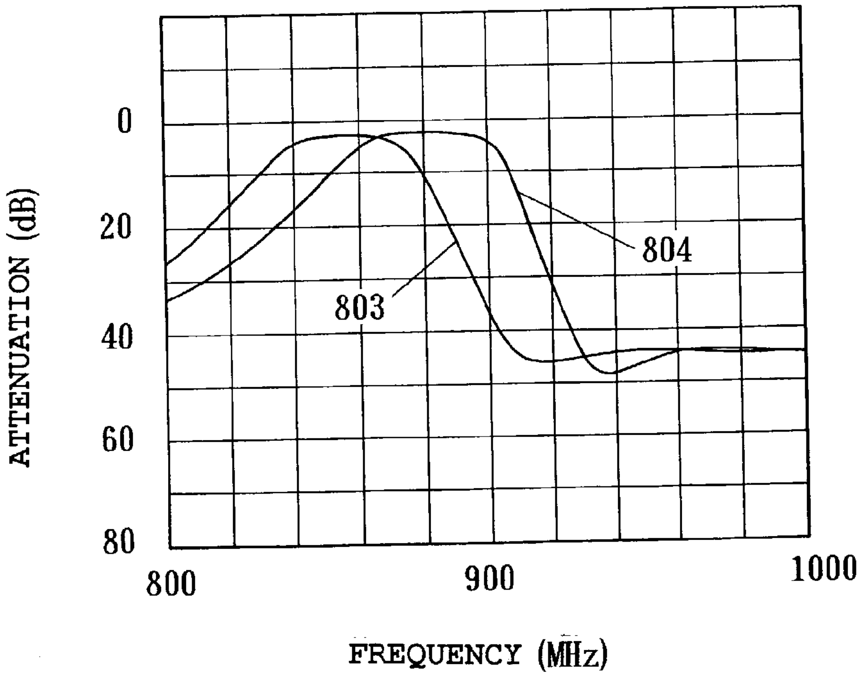

FIGS. 12*a* and 12*b* show transfer characteristics of the RF device according to the embodiment 2 of this invention. FIG. 12(*a*) shows a transfer characteristic of the transmitting filter 540 composed of the transmission line from the transmitting terminal 530 to the antenna terminal 529, the resonators 501 and 502 connected to the transmission line via the series capacitors 506 and 507, respectively, and the inter-stage coupling inductor 510. The coupling inductor 510, the series inductor 518 connected to the output terminal of the transmitting filter 540, and the ground capacitors 508, 509 and 517 provide a low pass characteristic to suppress harmonics in a transmitting band.

The inductor 518 and capacitor 517 serve also to adjust the impedances of the transmitting filter 540 and receiving band pass filter 541 to prevent the filters from affecting each other in their respective frequency bands at the antenna terminal 529. Since the impedances of the transmitting filter 540 and the receiving band pass filter 541 are adjusted in this way, the transmitting filter 540 exhibits a low insertion loss for the sent signal in the transmitting frequency band, which is the pass band, and therefore, can transmit the sent signal from the transmitting terminal 530 to the antenna terminal 529 with little attenuation of the sent signal.

On the other hand, the transmitting filter 540 exhibits a high insertion loss for the received signal in the receiving frequency band, and therefore, reflects most of the input signal in the receiving frequency band. Thus, the received signal inputted through the antenna terminal 529 is directed toward the receiving band pass filter 541.

FIG. 12(*b*) shows a transfer characteristic of the receiving band pass filter 541 composed of the transmission line from the antenna terminal 529 to the receiving terminal 531, the grounded resonators 503, 504 and 505, the inter-stage coupling capacitors 513 and 514, and the input/output coupling inductors 511 and 512. The impedance characteristic of the receiving band pass filter 541 and the impedances of the capacitors 515 and 516 used in the bypass circuit provide an attenuation pole as shown in FIG. 12(*b*).

In the circuit arrangement shown in FIG. 9, since the inductors are used for coupling of the input and the output, the impedance of the bypass circuit is equivalently inductive, and the attenuation pole appears in a region in the vicinity of a frequency where the impedance of the receiving band pass filter 541 becomes capacitive, that is, a transmitting frequency higher than a center frequency of the receiving band pass filter 541.

The receiving band pass filter 541 exhibits a low insertion loss for the received signal in the receiving frequency band and can transmit the received signal from the antenna terminal 529 to the receiving terminal 531 with little attenuation of the received signal. On the other hand, the receiving band pass filter 541 exhibits a high insertion loss for the sent signal in the transmitting frequency band and therefore, reflects most of the input signal in the transmitting frequency band. Thus, the sent signal from the transmitting filter 540 is directed toward the antenna terminal 529.

In addition, to the open ends of the resonators 501, 502, 503, 504 and 505, there are connected frequency shift circuits composed of series connections of the switch coupling capacitors 524, 525, 526, 527 and 528 for blocking a direct current and the switches 519, 520, 521, 522 and 523 each having one end grounded, respectively.

That is, a resonance frequency of the resonators 501 to 505 is determined by a capacitance component and inductance component of the respective resonators and a capacitance of their respective frequency shift circuits at the time when their respective switches 519 to 523 are in the on state or off state. If any of the switches 519 to 523 is turned on, the capacitance component of the frequency shift circuit is increased, and accordingly, the resonance frequency of the resonator is reduced. As a result, the blocking band of the transmitting filter 540 and the center frequency and pass band of the receiving band pass filter 541 are shifted to a lower frequency. On the other hand, if any of the switches 519 to 523 is turned off, the capacitance component of the frequency shift circuit is reduced, and accordingly, the resonance frequency of the resonator is increased. As a result, the blocking band of the transmitting filter 540 and the pass band of the receiving band pass filter 541 are shifted to a higher frequency. In other words, the blocking band of the transmitting filter 540 and the pass band of the receiving band pass filter 541 can be shifted synchronously by operating switches 519 to 523 in this way.

FIG. 12 shows relationships between the transfer characteristics of the transmitting filter 540 and receiving band pass filter 541 configured as described above and the on or off state of the switches 519 to 523 in a frequency region from 800 to 1000 MHz. Reference numeral 801 in FIG. 12(*a*) and reference numeral 803 in FIG. 12(*b*) designate the transfer characteristic in the case where all of the switches 519 to 523 are turned on, and reference numeral 802 in FIG. 12(*a*) and reference numeral 804 in FIG. 12(*b*) designate the transfer characteristic in the case where all of the switches 519 to 523 are turned off. In this way, by switching of the switches 519 to 523, the send-side blocking frequency band and the receive-side frequency pass band of the RF device are changed synchronously.

Figure 13:
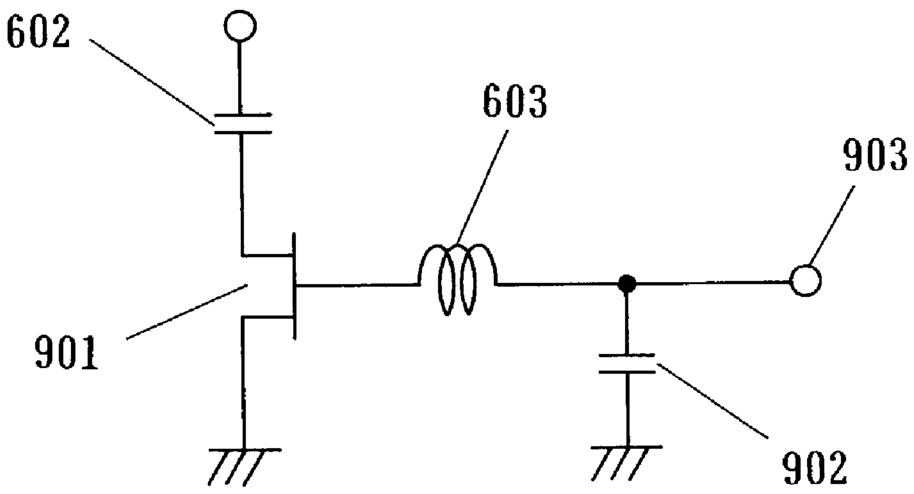
FIG. 13 shows a configuration of the RF device including a FET according to the embodiment 2 of this invention.

Besides the PIN diode described above, a transistor may serve as the switches 519 to 523. For example, FIG. 13 shows a case where a field effect transistor (FET) 901 serves as the switches 519 to 523. A gate electrode of the FET 901 is connected to a control terminal 903 via a bypass capacitor 902. Since the FET 901 is a voltage control device, no current is consumed when the device is turned on, unlike the case of the PIN diode. Thus, using such a FET 901 can reduce current consumption. Besides, if a varactor diode serves as the switches 519 to 523, the send-side blocking band and the receive-side pass band can be change continuously.

As described above, according to this embodiment, the blocking band of the transmitting filter 540 and the pass band of the receiving band pass filter 541 of the RF device can be controlled synchronously by the current or voltage applied thereto externally. Therefore, even if a certain wide band is required, an attenuation can be provided without increasing the number of the stages of each filter. In addition, since the number of the stages is small, the loss is reduced. As a result, the RF device itself can be downsized.

In addition, since the metal foil resonator is used as the resonator, the Quality factor of the resonator is enhanced. And, since the substrate made of the high temperature cofired ceramic with high dielectric constant having a good high frequency characteristic is overlaid on the upper surface of the metal foil resonator, the Quality factor of the resonator is further enhanced. As a result, each of the filters can be reduced in loss.

In the above description, the transmitting filter 540 is arranged on the transmitting side and the receiving band pass filter 541 is arranged on the receiving side. However, such an arrangement of the transmitting filter and receiving filter is obviously susceptible to various modifications, such as using a low pass filter, and of course, the modifications are included in this invention.

Besides, while the resonator devices 501, 502 and the impedance varying devices 519, 520, which are connected to each other in parallel by the capacitors, may be connected to each other by inductors.

This invention is the most effective if it is applied to a communication apparatus for a system with wide transmitting pass band and receiving pass band and a narrow interval between the transmitting pass band and the receiving pass band, such as PCS, EGSM, and CDMA in Japan. However, a system other than those described above may be contemplated.

For example, in another system, the transmitting pass band and the receiving pass band are each divided, with bandwidths thereof corresponding to each other, into two bands, that is, a transmitting Low band and a transmitting High band, and a receiving Low band and a receiving High band, respectively. For the respective two divisional bands, a control signal is used to switch between the transmitting band and the receiving band synchronously, with the transmitting Low band being associated with the receiving Low band and the transmitting High band being associated with the receiving High band. This is equivalent to widening the interval between the transmitting frequency and the receiving frequency during operation of the system, and thus, an attenuation can be ensured without increasing the number of the stages of each filter. Here, in this system, by selecting the band including the channel to be used by the control signal, whole of the transmitting pass band and receiving pass band can be covered. In addition, of course, the arrangement according to this invention can be applied to other systems including TDMA and CDMA.

In addition, since some or all of the capacitors and inductors except for the resonators 501 to 505 are composed of electrodes in the substrate 702 made of the ceramic with low dielectric constant, downsizing can be realized.

The configuration of each substrate in the RF device according to this embodiment may be the same as that according to the embodiment 1 (shown in FIGS. 13 to 16). That is, the substrate 702 may be equivalent to the substrate 101 and the substrate 703 may be equivalent to the substrate 106.

The RF device according to this embodiment has been described so far to operate while supporting only one system in the description. However, it may operate while supporting a plurality of systems.

Figure 2:
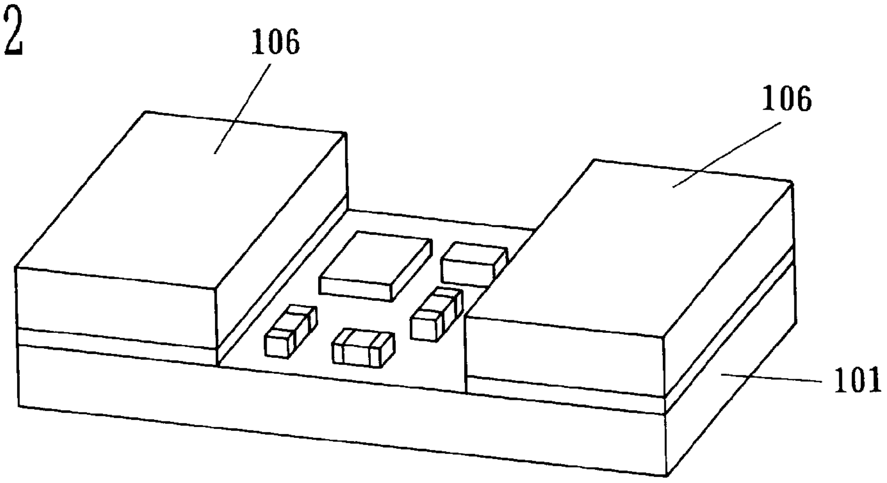
FIG. 2 is a perspective view of the RF device according to the embodiment 1 of this invention.
Figure 3:
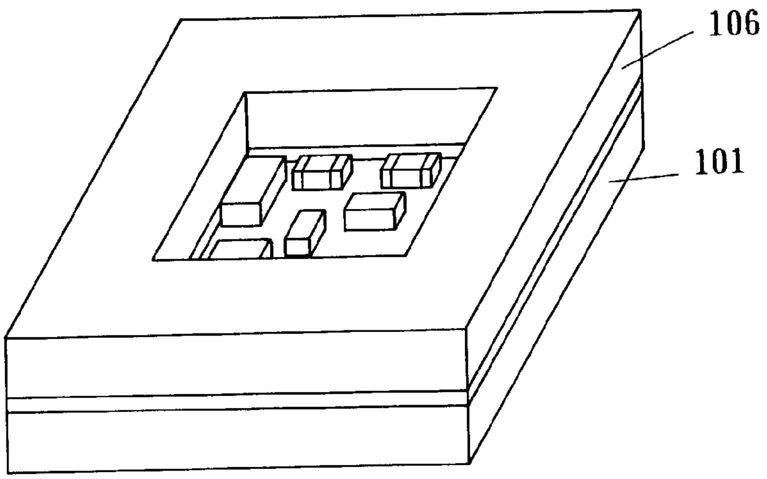
FIG. 3 is a perspective view of the RF device according to the embodiment 1 of this invention.
Figure 4:
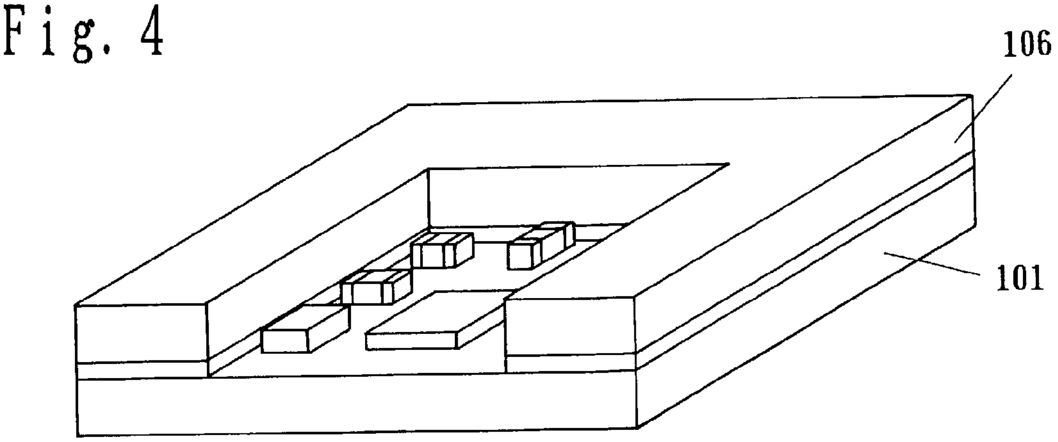
FIG. 4 is a perspective view of the RF device according to the embodiment 1 of this invention.

The configuration of the RF device described so far, in which one substrate made of a ceramic with high dielectric constant is overlaid on another substrate made of a ceramic with low dielectric constant, is not limited to those shown in FIGS. 1 and 11, and may be those shown in FIGS. 2, 3 and 4.

In the case where the two substrates 106 are disposed on the substrate 101 with spaced apart from each other as shown in FIG. 2, if the transmitting filter 407 is constituted by one of the substrates 106 and the substrate 101 and the receiving filter 408 is constituted by the other of the substrates 106 and the substrate 101, the transmitting filter 407 and the receiving filter 408 can be prevented from interfering with each other, and therefore, a high performance RF device can be provided.

In the above description, the RF device according to this invention has been described to be composed of the substrate 101 or 702 made of a ceramic with low dielectric constant and the substrate 106 or 703 made of a ceramic with high dielectric constant overlaid thereon. However, the substrate 101 or 702 and the substrate 106 or 703 may be arranged side by side.

Figure 17:
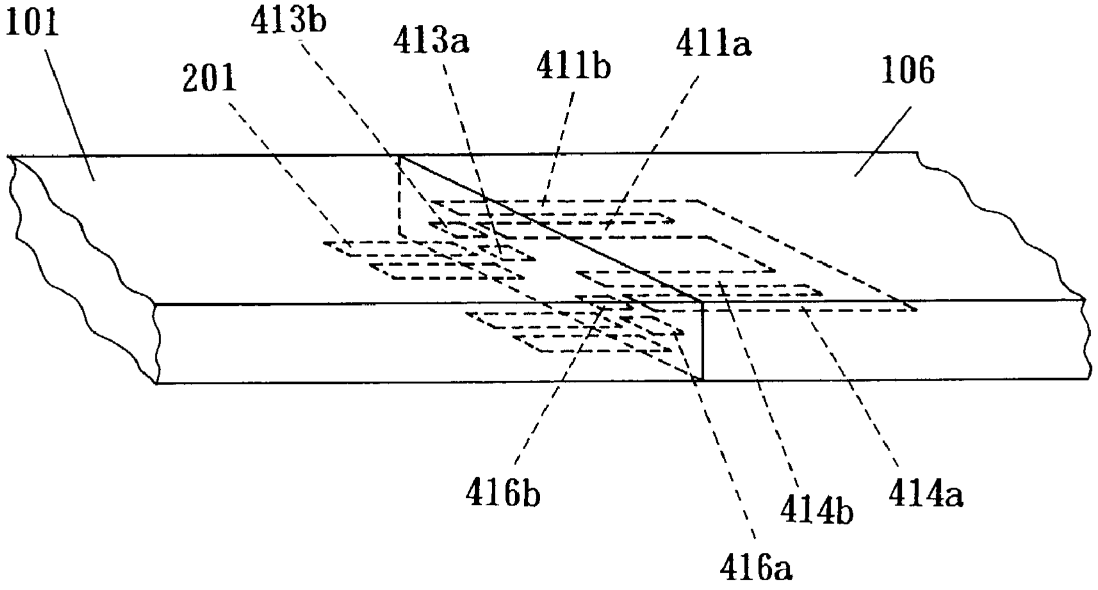
FIG. 17 is a perspective view of the RF device according to the embodiment 1 of this invention.
Figure 18:
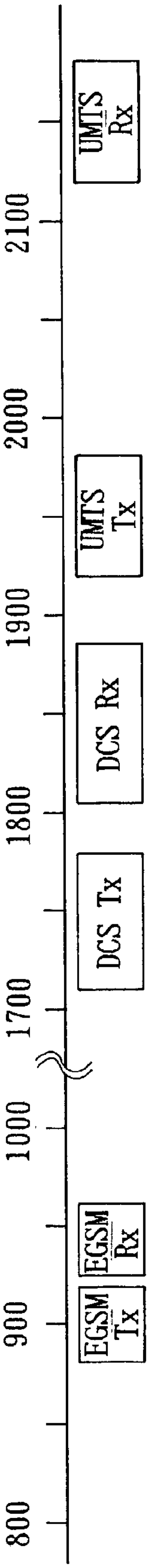
Fig. 18 PRIOR ART
FIG. 18 shows frequencies of a plurality of systems for which a first conventional RF device operates.
Figure 19:
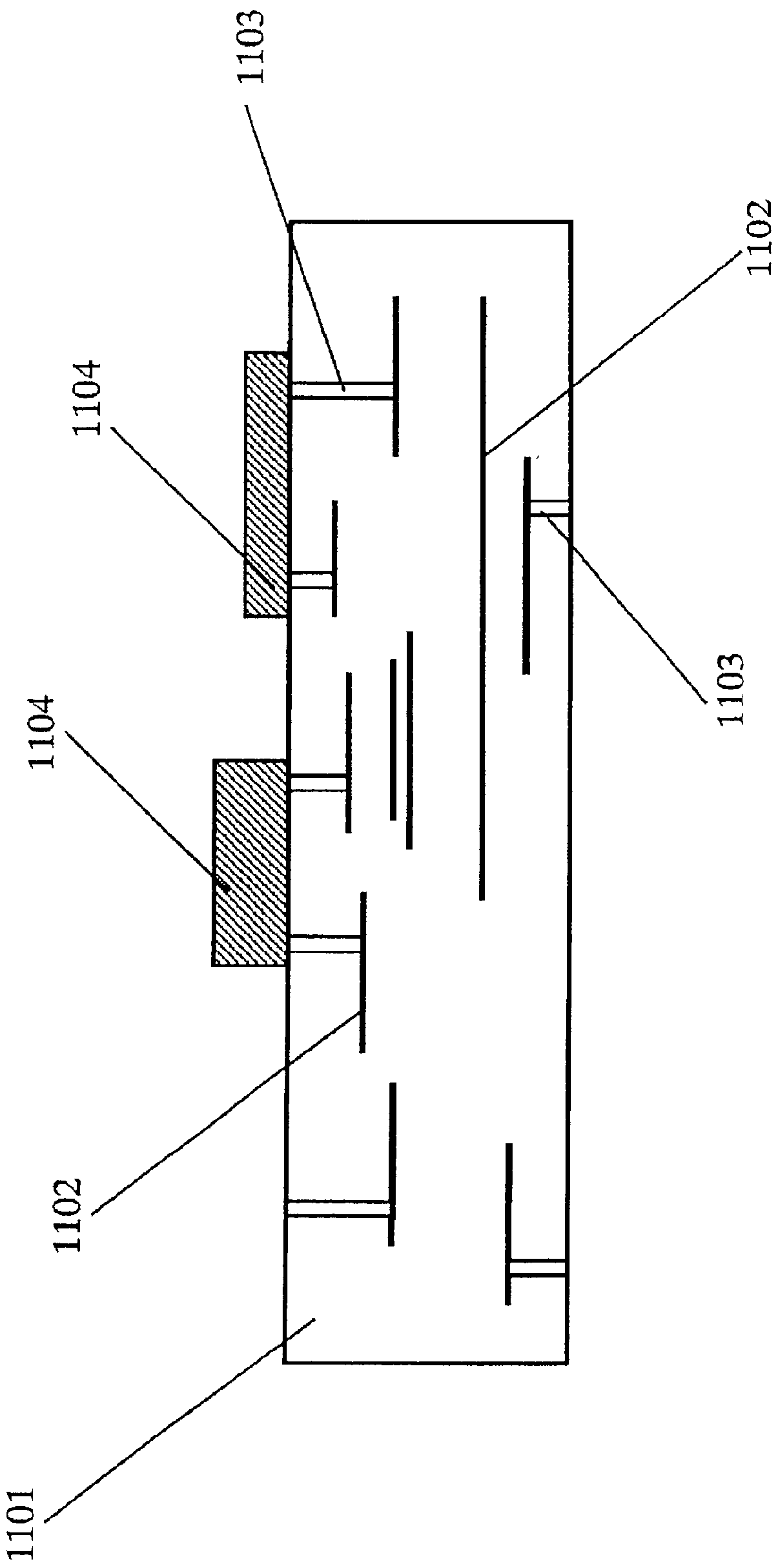
Fig. 19 PRIOR ART
FIG. 19 is a cross-sectional view of the first conventional RF device.
Figure 20:
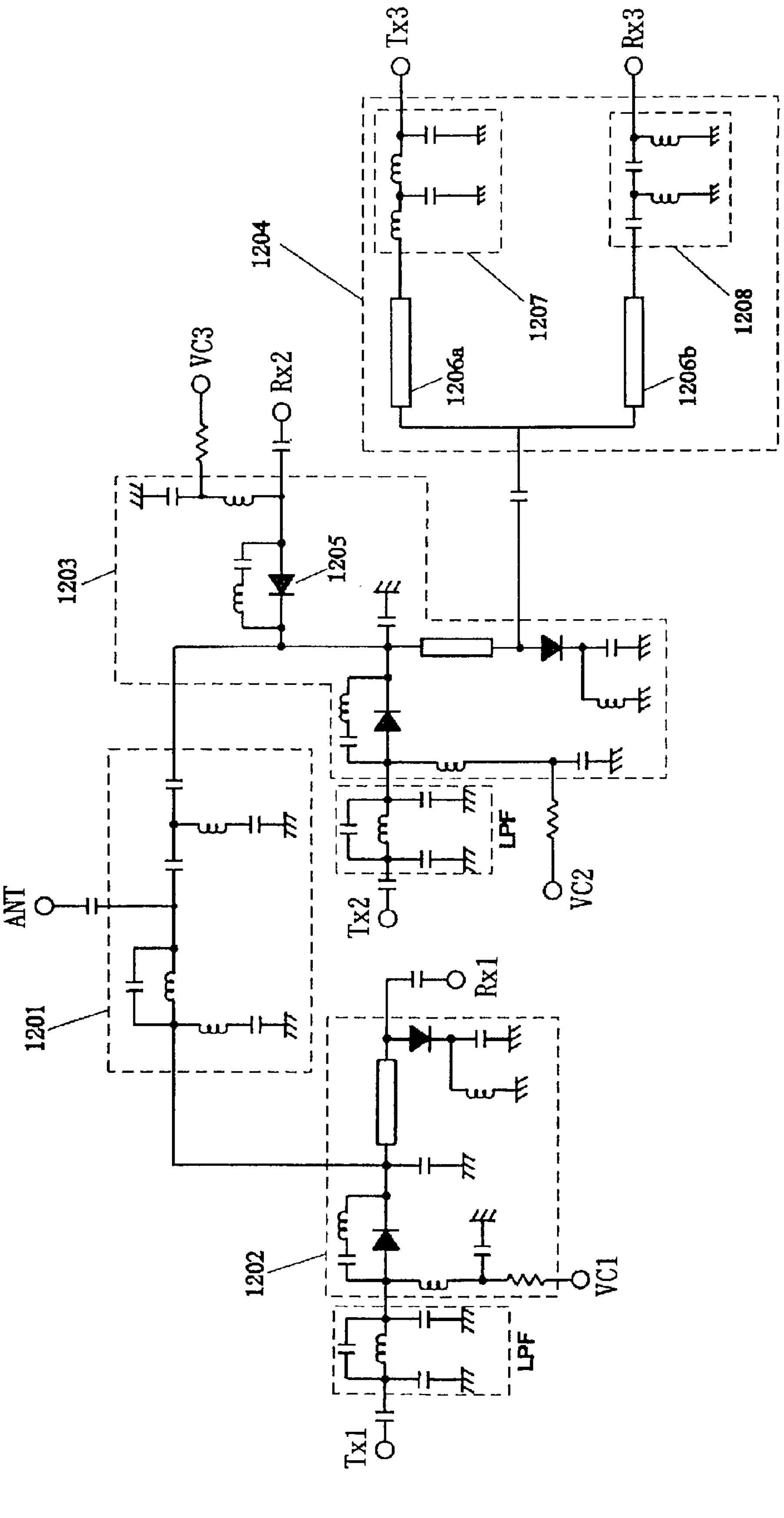
Fig. 20 PRIOR ART
FIG. 20 is a circuit diagram of the first conventional RF device.
Figure 21:
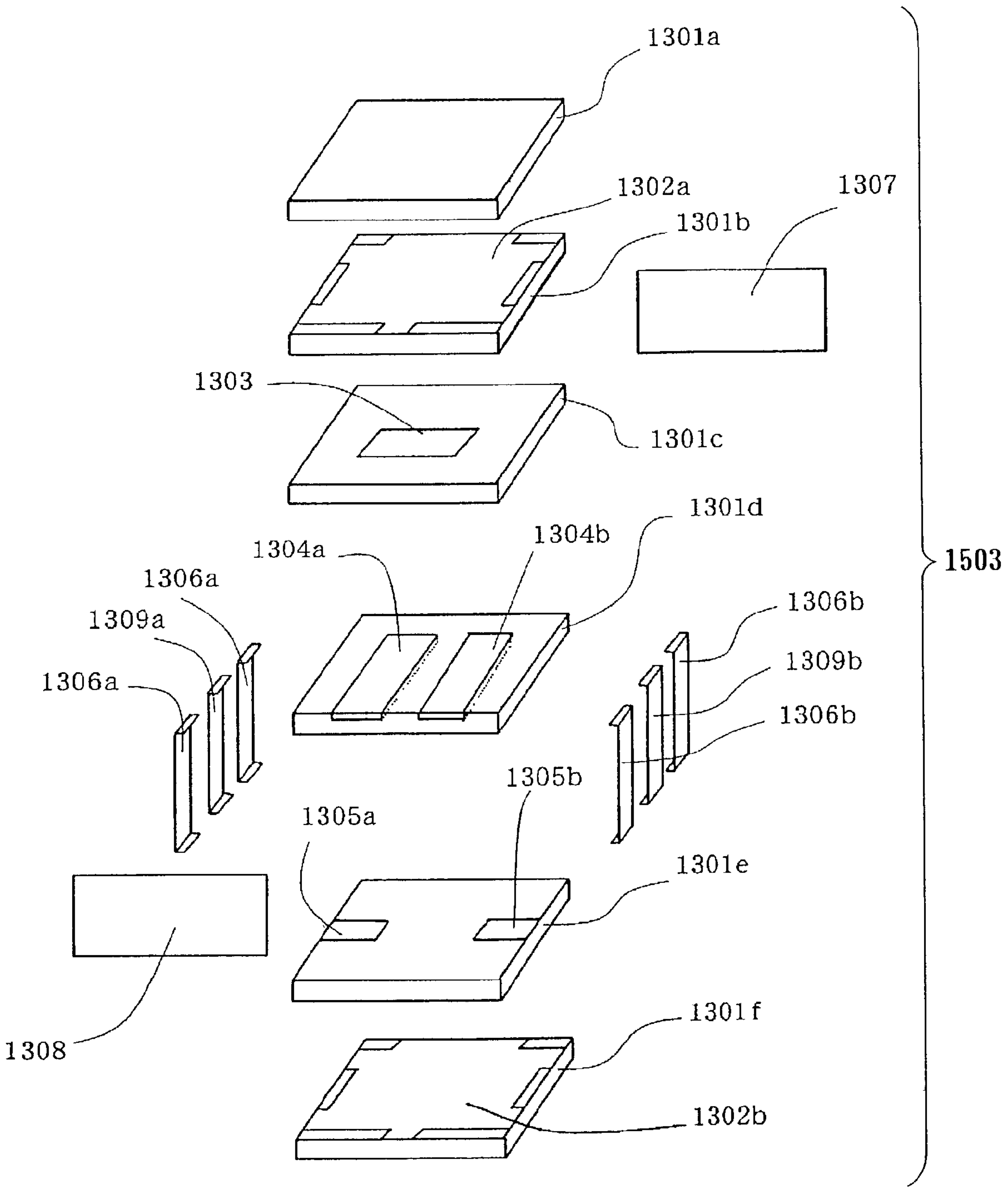
Fig. 21 PRIOR ART
FIG. 21 is an exploded perspective view of a second conventional RF device.
Figure 22:
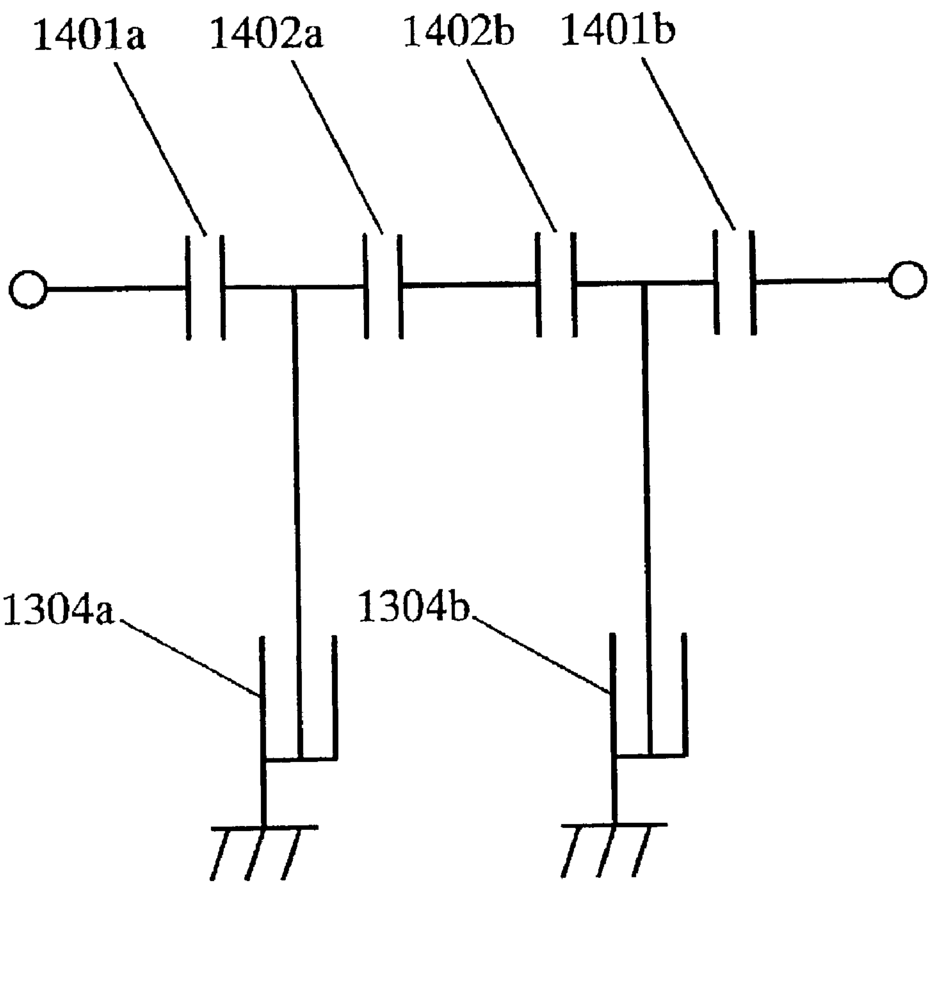
Fig. 22 PRIOR ART
FIG. 22 is a circuit diagram of the second conventional RF device.
Figure 23:
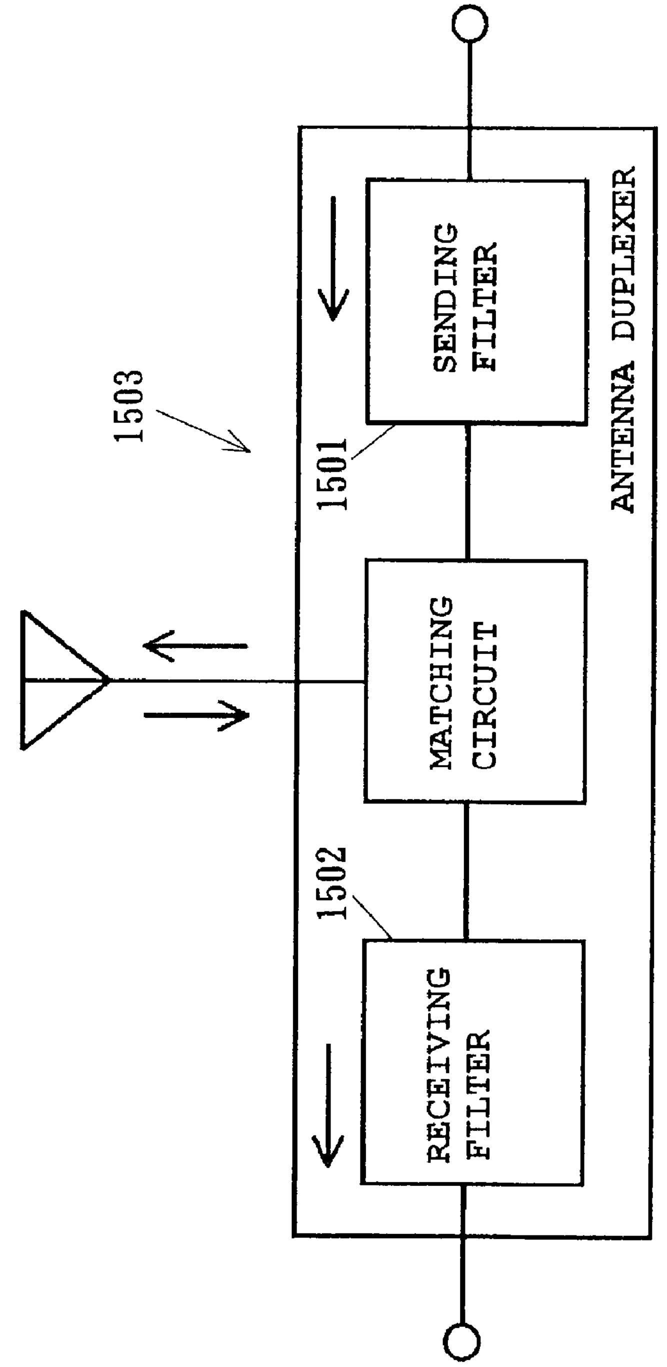
Fig. 23 PRIOR ART
FIG. 23 is a block diagram of a duplexer of the second conventional RF device.

FIG. 17 shows an arrangement in which the substrates 101 and 106 are arranged side by side and a high frequency circuit formed on or in the substrate 101 and a high frequency circuit formed in the substrate 106 are connected to each other through the wiring pattern 201. In such a case, the same effect as described above can be attained.

As described above, according to this invention, the metal foil is used for the resonator constituting the duplexer and a ceramic with high dielectric constant having a good material characteristic is provided on the upper surface of the resonator, whereby the resonator with low loss can be provided. Furthermore, external components arranged in or on the upper surface of the low temperature cofired ceramic with low dielectric constant constitute multilayered switches for a plurality of systems, and the duplexer is formed on the upper surface thereof, whereby a compact RF device with low loss provided also for the TDMA and CDMA can be provided.

According to this invention, an RF device having a low filter loss and not suffering from a problem about a line impedance, or a compact RF device not suffering from a problem about a line impedance can be provided.

What is claimed is:

1. An RF device comprising:

a first substrate made of a material with a lower relative dielectric constant;

a first RF circuit for a lower frequency band, which is provided in said first substrate;

a second substrate made of a material with a higher relative dielectric constant larger than said lower relative dielectric constant, and a second RF circuit for a higher frequency band, at least a part of which is provided in a vicinity of said second substrate, wherein said first RF circuit and said second RF circuit are connected to each other, said part of said second RF circuit is sandwiched between said first substrate and said second substrate, said second substrate is partially overlaid on said first substrate, a semiconductor device or passive device is provided on a region in the surface of said first substrate on which said second substrate is not overlaid, and a multilayered wiring pattern made of copper or silver is formed in said first substrate, whereby said first RF circuit is formed.

2. The RF device according to claim 1, wherein said second substrate comprises a plurality of substrates disposed on said first substrate with spaced apart from each other, one of said plurality of substrates constitutes a transmitting filter, and another of said plurality of substrates constitutes a receiving filter.

3. The RF device according to claim 1, wherein said lower frequency band is a frequency band for a TDMA mode, and said higher frequency band is a frequency band for a CDMA mode.

4. The RF device according to claim 1, wherein each of said first and second substrates is composed of a multilayered and integrally molded ceramic.

5. The RF device according to claim 1, wherein said first substrate is made of a low temperature cofired ceramic and said second substrate is made of a high temperature cofired ceramic.

6. The RF device according to claim 1, wherein said part of said second RF circuit is a resonator electrode, and said resonator electrode comprises a metal foil.

7. The RF device according to claim 6, wherein the RF device is integrated by filling a space defined by said first substrate, said second substrate and said resonator electrode with a thermosetting resin.

8. The RF device according to claim 1, wherein said semiconductor device includes any one of a PIN diode device, a GaAs semiconductor device, a field effect transistor (FET) device and a varactor diode device, and switching between said first RF circuit and said second RF circuit is realized by an operation of any one of said devices.

9. The RF device according to claim 1, wherein a whole or a part of said second substrate is covered with a shielding electrode.

10. The RF device according to claim 1, wherein said passive device includes a SAW filter with an electrode hermetically sealed.

11. A communication apparatus, comprising the RF device according to any one of claims 1 to 10, a transmitting circuit, a receiving circuit and an antenna which are connected to said RF device.

* * * * *